US012674658B2

(12) United States Patent　(10) Patent No.: US 12,674,658 B2

Williams　(45) **Date of Patent: *Jul. 7, 2026**

(54) PARTIAL COHERENCE MITIGATION IN VIDEO MEASUREMENT SYSTEMS VIA ILLUMINATION APODIZATION

(71) Applicant: QUALITY VISION INTERNATIONAL INC., Rochester, NY (US)

(72) Inventor: Daniel James Lawler Williams, Rochester, NY (US)

(73) Assignee: Quality Vision International Inc., Rochester, NY (US)

( * ) Notice: Subject to any disclaimer, the term of this patent is extended or adjusted under 35 U.S.C. 154(b) by 359 days.

This patent is subject to a terminal disclaimer.

(21) Appl. No.: 18/228,227

(22) Filed: Jul. 31, 2023

(65) Prior Publication Data

US 2023/0375329 A1　Nov. 23, 2023

Related U.S. Application Data

(63) Continuation-in-part of application No. 17/166,239, filed on Feb. 3, 2021, now Pat. No. 11,835,330.

(51) Int. Cl.
G01B 11/02　(2006.01)
F21V 8/00　(2006.01)
(Continued)

(52) U.S. Cl.
CPC ........ G01B 11/022 (2013.01); G01B 11/2433 (2013.01); G02B 5/0242 (2013.01);
(Continued)

(58) Field of Classification Search
CPC .............. G01B 11/022; G01B 11/2433; G02B 5/0242; G02B 5/3083; G02B 6/0096; G02B 26/023; G02B 27/281
See application file for complete search history.

(56) References Cited

U.S. PATENT DOCUMENTS 2,666,362 A　*　1/1954　Tillyer ................... G02B 21/14
359/371
5,610,391 A　　3/1997　Ringlien
(Continued)

FOREIGN PATENT DOCUMENTS

CN　　1131740 A　　9/1996
EP　　0031973 A2　　7/1981
(Continued)

OTHER PUBLICATIONS

Considine (1966) "Effects of Coherence on Imaging Systems," Journal of Optical Society of America 56: 1001-1009.
(Continued)

*Primary Examiner* — Michael P LaPage
(74) *Attorney, Agent, or Firm* — Harter Secrest & Emery LLP; Jodi A. Reynolds

(57) ABSTRACT

A video measurement system for measuring a test object comprising an imaging system having an imager having an imaging pupil, the imager arranged for viewing at least a portion of a silhouette of a test object by receiving light transmitted by the test object over a first angular extent, an illumination system having an optical axis and emitting an illumination distribution of light along an optical path, the illumination system comprising a lens system and a subassembly having an illumination source, a pupil aperture, and a first polarizer, the first polarizer having a diameter that is smaller than the pupil aperture, and a second polarizer overlapping the first polarizer, the second polarizer having a diameter that is larger than the first polarizer, the second polarizer configured to rotate independent of and relative to the subassembly.

23 Claims, 18 Drawing Sheets

(51) Int. Cl.

| | |
|---|---|
| *G01B 11/24* | (2006.01) |
| *G02B 5/02* | (2006.01) |
| *G02B 5/30* | (2006.01) |
| *G02B 26/02* | (2006.01) |
| *G02B 27/28* | (2006.01) |

(52) U.S. Cl.

CPC ......... *G02B 5/3083* (2013.01); *G02B 6/0096* (2013.01); *G02B 26/023* (2013.01); *G02B 27/281* (2013.01)

(56) References Cited

U.S. PATENT DOCUMENTS

| | | | |
|---|---|---|---|
| 6,243,162 B1 | 6/2001 | Baist et al. | |
| 6,625,102 B1 * | 9/2003 | Hashimoto | G02B 27/28 369/110.02 |
| 6,847,442 B1 | 1/2005 | Katzir et al. | |
| 7,889,338 B2 | 2/2011 | Heiden | |
| 9,360,423 B2 * | 6/2016 | Yu | G02B 21/0056 |
| 9,784,564 B2 | 10/2017 | Schwab et al. | |
| 10,007,194 B2 * | 6/2018 | Tanitsu | G02B 27/286 |
| 10,701,259 B2 | 6/2020 | Bloch | |
| 2003/0011881 A1 | 1/2003 | Sure | |
| 2004/0125373 A1 * | 7/2004 | Oldenbourg | G02B 21/0004 356/364 |
| 2004/0156109 A1 | 8/2004 | Hoover et al. | |
| 2005/0041232 A1 * | 2/2005 | Yamada | G03B 27/72 355/71 |
| 2005/0046863 A1 * | 3/2005 | Millerd | G01B 9/02038 356/521 |
| 2013/0038941 A1 | 2/2013 | Pesach et al. | |
| 2015/0341605 A1 | 11/2015 | Yamada et al. | |
| 2018/0329190 A1 | 11/2018 | Bloch | |
| 2020/0150318 A1 | 5/2020 | Vermeer et al. | |

FOREIGN PATENT DOCUMENTS

| | | | |
|---|---|---|---|
| EP | 698776 | A2 | 2/1996 |
| EP | 1172682 | A1 | 1/2002 |
| JP | H08184416 | A | 7/1996 |
| JP | 2000-356758 | A | 12/2000 |
| JP | 2008298772 | A | 12/2008 |
| JP | 2015-087536 | A | 5/2015 |
| KR | 10-2001-0102523 | A | 11/2001 |
| WO | 2000/055677 | A1 | 9/2000 |

OTHER PUBLICATIONS

Edmund Optics "Telecentric Illumination," Imaging Resource Guide, Section 11.4, 3 pages, accessed Feb. 1, 2023.

Goodman (1979) "Stationary Optical Projectors," Dissertation, Univ. Arizona, 475 pages.

Goodman (2004) "Graphical methods to help understand partially coherent imaging," Proc. SPIE 5377, Optical Microlithography XVII.

Hopkins (1953) "On the Diffraction Theory of Optical Images," Proceedings of the Royal Society 217(1130): 408-432.

Japan Patent Office (ISA/JP), International Search Report and Written Opinion in PCT/US2022/014072, dated May 17, 2022, 6 pages.

Jerke (1975) "Optical and Dimensional-Measurement Problems With Photomasking in Microelectronics," National Bureau of Standards special publication 400-20, 50 pages.

Senchenko et al. (2011) "Shadow Inspection of 3D Objects in Partially Coherent Light," Measurement Science Review 11(4): 104-107.

Vandendriessche "Polarizer Selection Guide," Edmund Optics Worldwide, 7 pages, accessed Feb. 1, 2023.

https://web.archive.org/web/20140913131412/http://www.avtanski.net/diy/?p=15 "One-Penny Darkfield Illumination Filter," accessed Mar. 21, 2023, 2 pages.

* cited by examiner

26

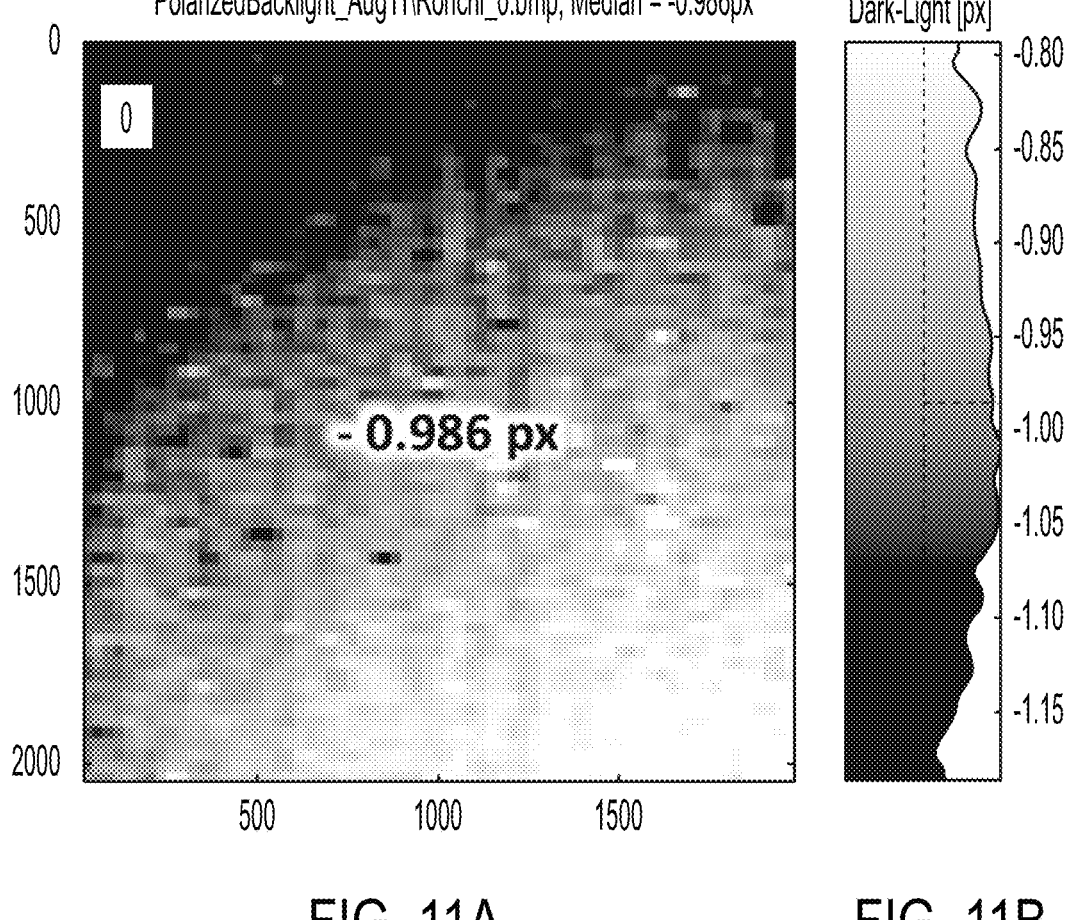
FIG. 11A                    FIG. 11B

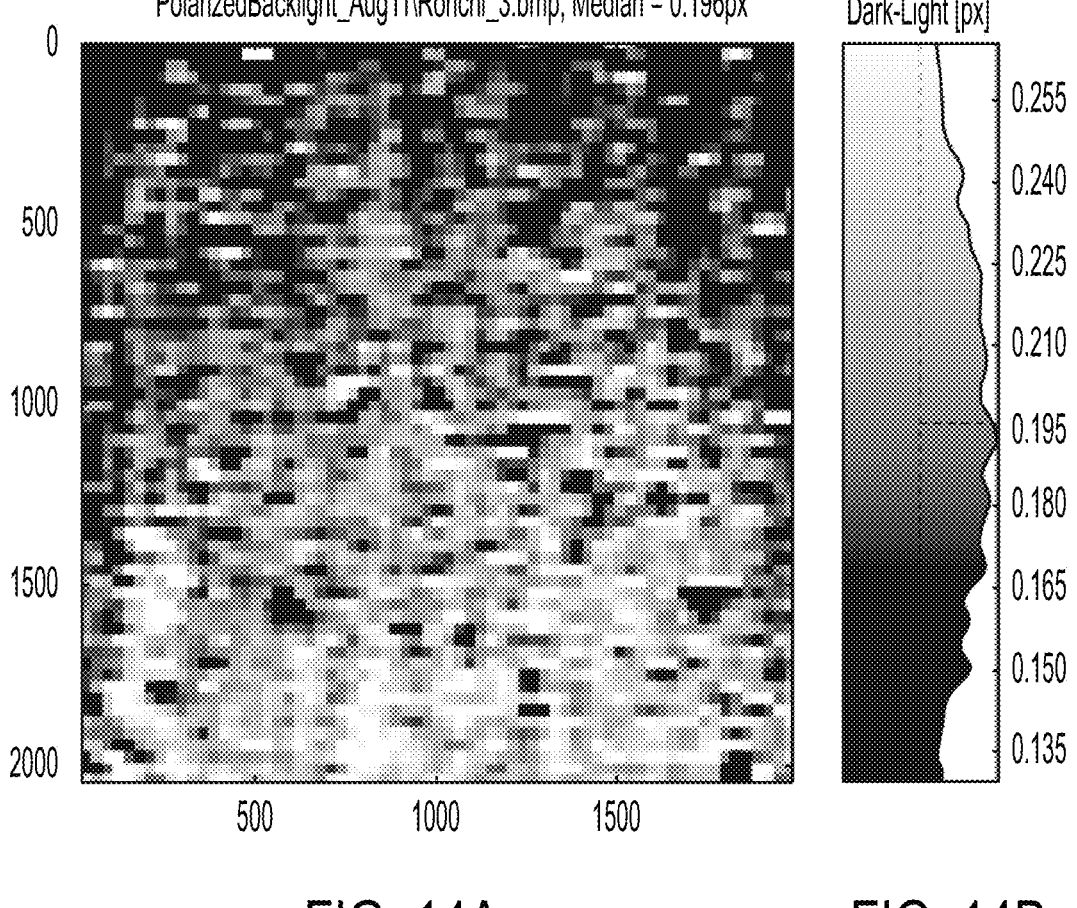
FIG. 14A                    FIG. 14B

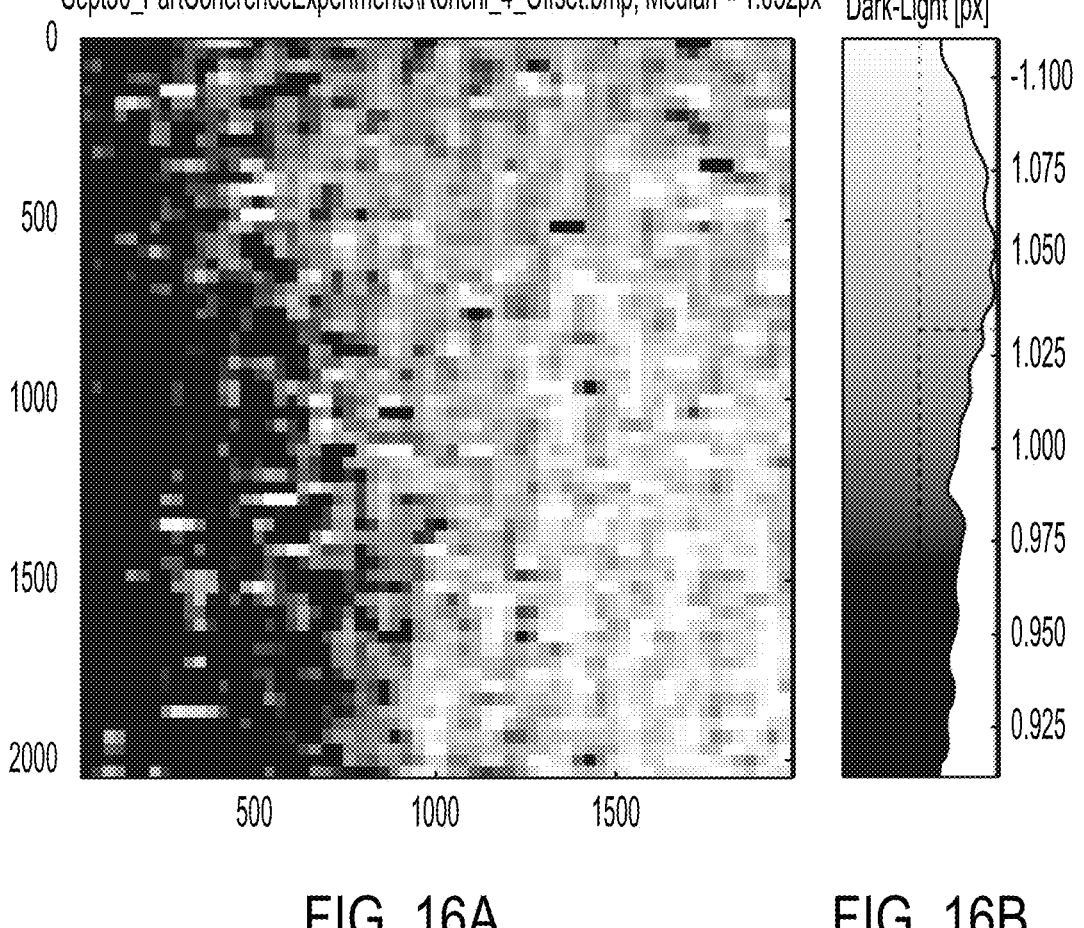
FIG. 16A                    FIG. 16B

242

244

PARTIAL COHERENCE MITIGATION IN VIDEO MEASUREMENT SYSTEMS VIA ILLUMINATION APODIZATION

CROSS-REFERENCE TO RELATED APPLICATIONS

This application is a continuation in part of prior application Ser. No. 17/166,239 filed on Feb. 3, 2021, the entire disclosure of which is hereby incorporated by reference.

BACKGROUND OF THE INVENTION

Field of the Invention

This invention relates to illuminators for video measurement systems, and more particularly to such illuminators that provide for apodizing the illuminator.

Description of Related Art

Video measurement machines gather metrological data from test objects. U.S. Pat. Nos. 10,701,259 and 9,784,564 teach various aspects of such video measurement machines and are incorporated herein by reference in their entirety. One way video measurement machines gather metrological data is by "backlighting," wherein the test object is illuminated from one direction and the test object is imaged from the opposite direction. When backlighting a test object, the test object itself appears dark to the imaging system and the remaining background appears light. Thus, the test object appears in silhouette. The object profiles are then identified by the points of transition between light and dark, where the light that surrounds or passes through the test object is contrasted with adjacent portions of the view at which light is blocked. The imaging system then images the test object silhouettes. Object profiles can then be identified by the points of transition where light that surrounds or passes through the test object is contrasted with adjacent portions of the view at which light is blocked. Backlights of video measuring machines are typically designed to form an angularly uniform illumination distribution, but this can cause an apparent shift of edges on the backlit test objects as observed on video measurement machines. The apparent edge shift goes from dark-to-light regardless of the orientation of the edges, so that silhouettes of opaque, backlit objects generally measure larger than expected and the inner diameter of rings measure smaller than expected. This is due largely to an optical phenomenon called partial coherence.

There are several techniques used to resolve the problem of shifted edges. Typically, the aperture stop of the illuminator is approximately matched to the aperture stop of the imaging system to limit the range of angles through which the object is illuminated. Overfilled imaging system apertures have higher angles of light that can enter the imaging system aperture by specular or diffuse reflections which may cause the boundaries of the object silhouette to be obscured. Thus, a certain range of angles is collected by the imaging system to image the silhouette boundaries while the range of illumination angles is limited to avoid detrimentally illuminating the test object from different directions. Current configurations of video measuring machines can provide a magnitude of the apparent edge shift of a backlit test object of less than 10 μm. However, this edge shift is observable and still consequential in many applications. Incoherent illumination, or vastly increasing the angular extent of illumination has also been considered as an illumination solution to edge shift. For an F/100 imager, experiences have shown that increasing the illumination from F/50 to F/5 greatly reduces the magnitude of the apparent edge shift. Moreover, placing a diffuser immediately after a backlight or opening the backlight pupil can help some objects measure closer to nominal, for example, "zero thickness" chrome on glass reticles. These techniques, however, can still create problems when measuring certain test parts. For example, a "wraparound" effect can be observed when test objects with curved or inclined surfaces, such as a gage pin, are measured. The "wraparound" effect is a result of the wide angular extent of the illumination reflecting from the curved or inclined surfaces within the test object profile and entering the imagining system aperture. In other words, edges created by curved or inclined walls can specularly reflect light into the imager, introducing another error source into edge localization. Another possible technique to resolve the problem of shifted edges is to correct the values using software after the edges of interest have been located. In this case, the true edge position is determined by both system- and object-specific post-processing of edge profiles. Typically, a nuanced algorithm is used to find the true edge position, requiring inputs of illumination angular extent and object-edge depth. A problem with this approach, however, is that it is more desirable to acquire an image where no such corrections are needed and a prior knowledge of the object is unnecessary.

BRIEF SUMMARY OF THE INVENTION

The invention contemplates a video measurement system for measuring a test object where partial coherence-induced edge shift is mitigated via illumination apodization. According to one approach, a video measurement system for measuring a test object comprises an imaging system comprising an imager having an imaging pupil, the imager arranged for viewing at least a portion of a silhouette of the test object by receiving light transmitted by the test object over a first angular extent, and, an illumination system comprising (i) an illumination source; (ii) output having a second angular extent in object space that is larger than the first angular extent received by the imaging pupil; and (iii) a substrate arranged to diffuse light from the illumination source, the substrate having an axial centerline and a light obscuration element, wherein the light obscuration element is at least approximately coaxial to the axial centerline of the substrate, and wherein the pupils of the illumination and imaging systems are in at least approximately conjugate image planes.

In one configuration, the substrate of the video measurement system comprises a front surface illuminated by the illumination source and a back surface wherein the light obscuration element is disposed on the front surface and is at least approximately coaxial to the axial centerline of the substrate. The substrate is a volumetric diffuser in certain configurations. The illumination system of the video measurement system in certain configurations has an object space numerical aperture that is larger than an object space numerical aperture of the imager. Typically, the imaging pupil axial centerline is at least approximately aligned with the light obscuration element. The second angular extent of the first illumination system in some configurations is twice as large as the first angular extent received by the imaging pupil. Moreover, the illumination system in a configuration further comprises an illumination pupil having an axial centerline and wherein the substrate further comprises a bore in the front surface and a ball disposed within the bore, wherein the bore is approximately coaxial to the axial centerline of the illumination pupil. The ball is an opaque, spherical ball in some configurations and the bore is substantially cylindrical.

In another configuration, the substrate of the video measurement system comprises a front surface illuminated by the illumination source and a back surface, wherein the light obscuration element is a pair of linear polarizing filters comprising (i) a first linear polarizing filter located between the illumination source and the front surface of the substrate; and (ii) a second linear polarizing filter overlapping the first linear polarizer, wherein one of the first and second linear polarizing filters is rotated in relation to the other one of the first and second linear polarizing filters. The illumination system in this configuration can further comprise an illumination pupil having an axial centerline, wherein a diameter of the second linear polarizing filter is smaller than a diameter of the illumination pupil and at least approximately coaxial to the axial centerline of the illumination pupil, and wherein the second linear polarizing filter is larger than a diameter of the conjugate image of the imaging pupil at the back surface of the substrate. In a configuration, the second linear polarizing filter is adhered to the back surface of the substrate. In another configuration, the second linear polarizing filter is adhered to the front surface of the substrate. In yet another configuration, the second linear polarizing filter is located between the illumination source and the first linear polarizing filter. The substrate can be rotated to rotate the second linear polarizing filter relative to the first linear polarizing filter. In one configuration, a mechanism rotates the first linear polarizing filter relative to the second linear polarizing filter.

According to another approach, a video measurement system for measuring a test object comprises an imaging system comprising an imaging pupil, the imager arranged for viewing at least a portion of a silhouette of the test object by receiving light transmitted by the test object over a first angular extent, an illumination system comprising an illumination source and having a second angular extent that is larger than the first angular extent received by the imaging pupil and a output wherein the pupils of the illumination and imaging systems are in at least approximately conjugate image planes, a substrate arranged to diffuse light from the illumination source, the substrate having a front surface and a back surface, wherein a bore is disposed in the front surface and wherein the front surface is illuminated by the illumination source; and an opaque ball disposed in the bore in the front surface of the substrate and sized to provide light obscuration of a portion of light from the illumination source. In some configurations, substrate front surface is diffuse and the substrate back surface is diffuse. In a configuration, the ball is a spherical ball bearing and the bore is substantially cylindrical. The imaging pupil and the ball each have an axial centerline, wherein the imaging pupil is at least approximately coaxial to the axial centerline of the ball.

In yet another approach, a video measurement system for measuring a test object comprises an imaging system comprising an imager having an imaging pupil, the imager arranged for viewing at least a portion of a silhouette of the test object by receiving light transmitted by the test object over a first angular extent, an illumination system having an illumination source and a second angular extent that is larger than the first angular extent received by the imaging pupil and a output, wherein the pupils of the illumination and imaging systems are in at least approximately conjugate image planes, a substrate arranged to diffuse light from the illumination source, the substrate having a front surface and a back surface, a first linear polarizing filter located between the illumination source and the front surface of the substrate; and a second linear polarizing filter overlapping the first linear polarizer, wherein one of the first and second linear polarizing filters is rotated in relation to the other one of the first and second linear polarizing filters. In a configuration, the illumination system further comprises an illumination pupil, the illumination pupil having an axial centerline, wherein the second linear polarizing filter is smaller than the illumination pupil and at least approximately coaxial to the axial centerline of the illumination pupil, and wherein the first linear polarizing filter is larger than the imaging pupil. The second linear polarizing filter is either disposed on the back surface of the substrate, between the first polarizing filter and the substrate, or between the illumination source and the first linear polarizing filter.

In a further configuration, a video measurement system for measuring a test object comprises an imaging system having an imager having an imaging pupil, the imager arranged for viewing at least a portion of a silhouette of a test object by receiving light transmitted by the test object over a first angular extent; an illumination system having an optical axis and emitting an illumination distribution of light along an optical path, the illumination system comprising a lens system and a subassembly having an illumination source, a pupil aperture, and a first polarizer, the first polarizer having a diameter that is smaller than the pupil aperture, and a second polarizer overlapping the first polarizer, the second polarizer having a diameter that is larger than the first polarizer, the second polarizer configured to rotate independent of and relative to the subassembly.

In yet another configuration, a method of measuring a test object comprises (a) presenting a test object within a video measuring system, the video measuring system having an imaging system and an illumination system; (b) emitting an illumination distribution of light along an optical path with the illumination system, the illumination system comprising a lens system and a subassembly having an illumination source, a pupil aperture, and a first polarizer, the first polarizer having a diameter that is smaller than the pupil aperture; (c) capturing at least a portion of a silhouette of a test object with an imager having an imaging pupil by receiving light transmitted by the test object; and (d) rotating a second polarizer independent of and relative to the subassembly to change a ratio of illumination passing through both the first and second polarizer, wherein the second polarizer (i) has a diameter that is larger than the first polarizer and (ii) overlaps the first polarizer.

In a further configuration a video measurement system for measuring a test object comprises an imaging system comprising an imager having an imaging pupil, the imager arranged for viewing at least a portion of a silhouette of a test object by receiving light transmitted by the test object over a first angular extent; an illumination system, the illumination system comprising an illumination source emitting an illumination distribution of light along an optical path, a lens system, a second angular extent that is larger than the first angular extent received by the imager, and an output, wherein the pupils of the illumination and imaging systems are in conjugate image planes; a subassembly within the illumination system, the subassembly comprising a pupil aperture and a first polarizer, the first polarizer having a diameter that is smaller than the pupil aperture, and a second polarizer overlapping the first polarizer, the second polarizer having a diameter that is larger than the first polarizer, the second polarizer configured to rotate independent of and relative to the subassembly.

BRIEF DESCRIPTION OF THE SEVERAL VIEWS OF THE DRAWING(S)

Figure 6A:
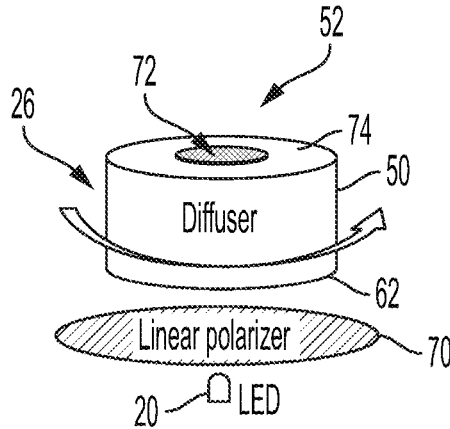
FIG. 6A is an enlarged diagram of a light obscuration element using a first and second linear polarizer, wherein the first linear polarizing filter is at least proximate the front surface of the diffuser and the second linear polarizing filter is disposed on the back surface of the diffuser.
Figure 6B:
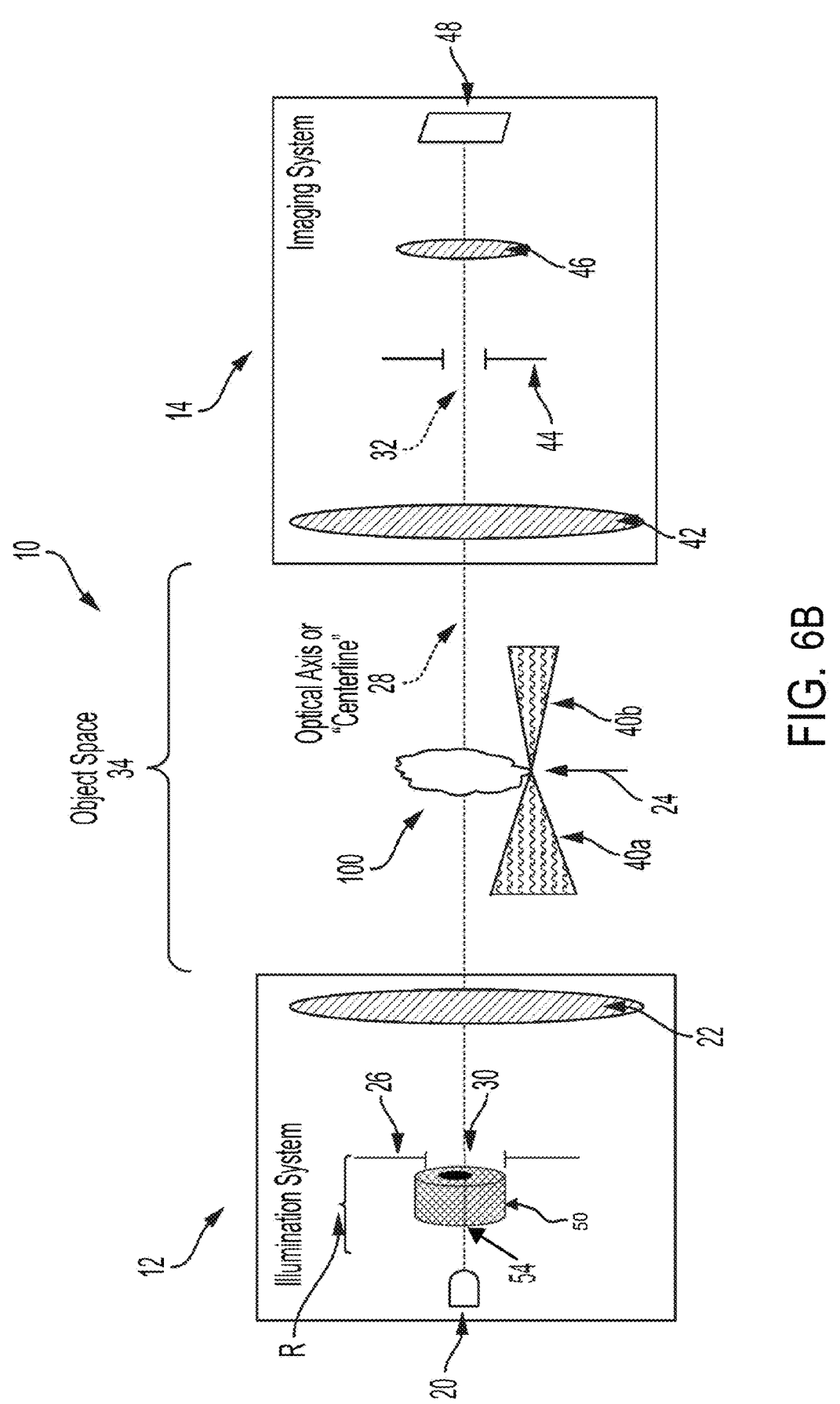
FIG. 6B is an enlarged diagram of the light obscuration element shown in FIG. 6A except in an alternative configuration.
Figure 9:
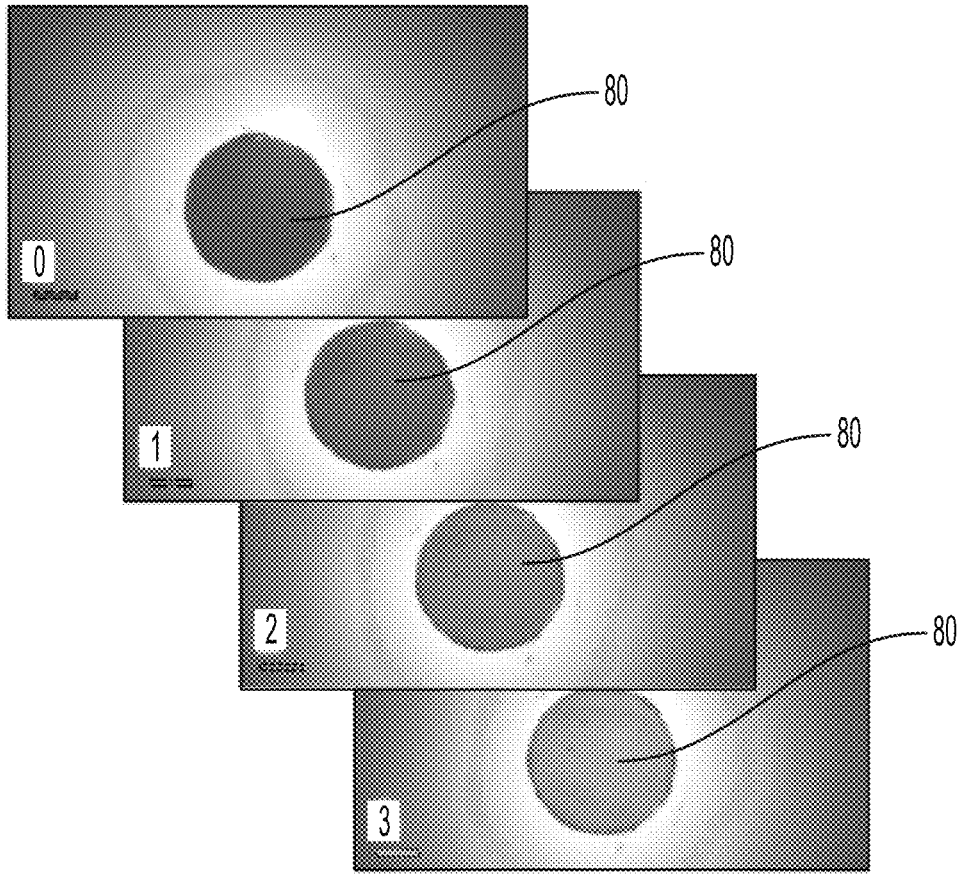
FIG. 9 is a set of images of the distributions shown in grayscale, the images obtained from using a first and second linear polarizer shown in FIG. 6 and rotating the second linear polarizer relative to the first linear polarizer.

FIG. 11A is a grayscale representation of a color heatmap of edge shifts provided with a median dark width minus light width error of −0.986px taken from a video measuring system being tuned using a first and second linear polarizer shown in FIG. 6 and rotating the second linear polarizer relative to the first linear polarizer to provide the image of the backlight distribution designed as 0 in FIG. 9.

FIG. 11B is a grayscale representation of a color histogram of values showing the median dark width minus light width error of −0.986px taken from a video measuring system being tuned using a first and second linear polarizer shown in FIG. 6 and rotating the second linear polarizer relative to the first linear polarizer to provide the image of the backlight distribution designed as 0 in FIG. 9.

Figures 12A, 12B:
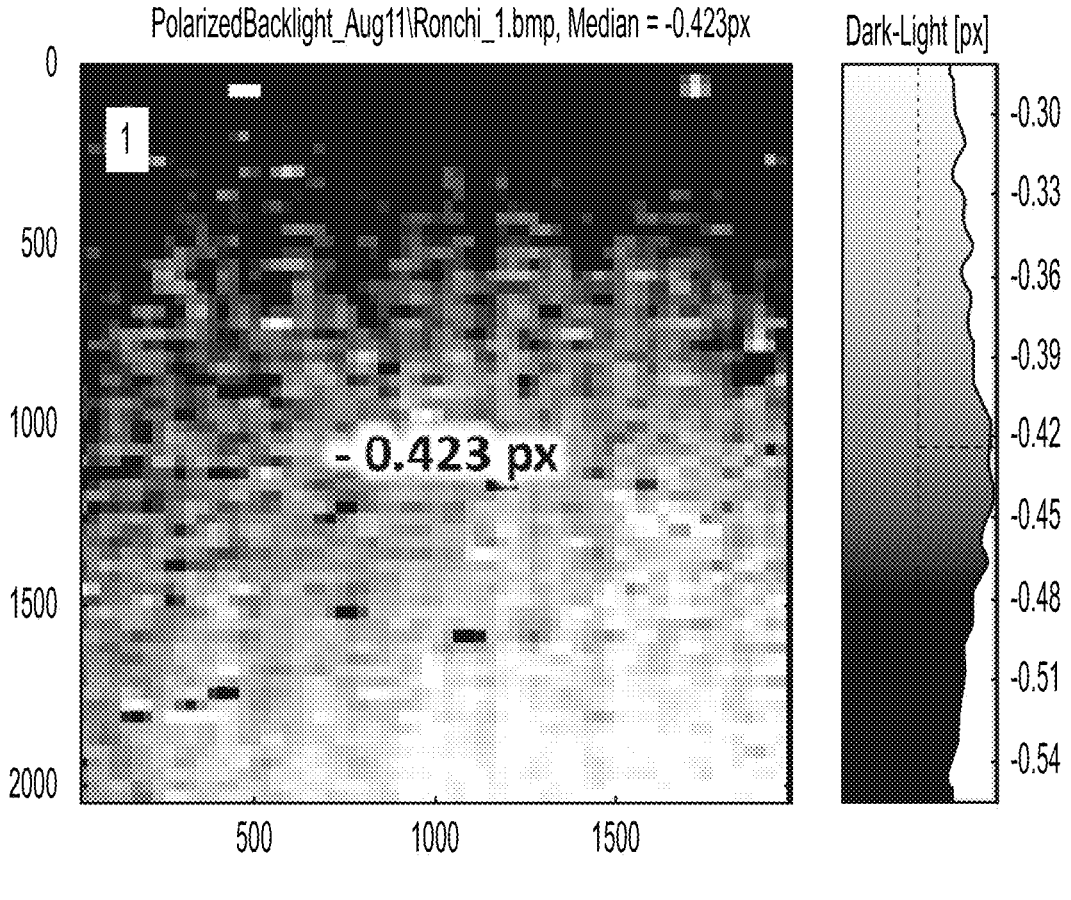

FIG. 12A is a grayscale representation of a color heatmap of edge shifts provided with a median dark width minus light width error of −0.423px taken from a video measuring system being tuned using a first and second linear polarizer shown in FIG. 6 and rotating the second linear polarizer relative to the first linear polarizer to provide the image of the backlight distribution designed as 1 in FIG. 9.

FIG. 12B is a grayscale representation of a color histogram of values showing the median dark width minus light width error of −0.423px taken from a video measuring system being tuned using a first and second linear polarizer shown in FIG. 6 and rotating the second linear polarizer relative to the first linear polarizer to provide the image of the backlight distribution designed as 1 in FIG. 9.

Figures 13A, 13B:
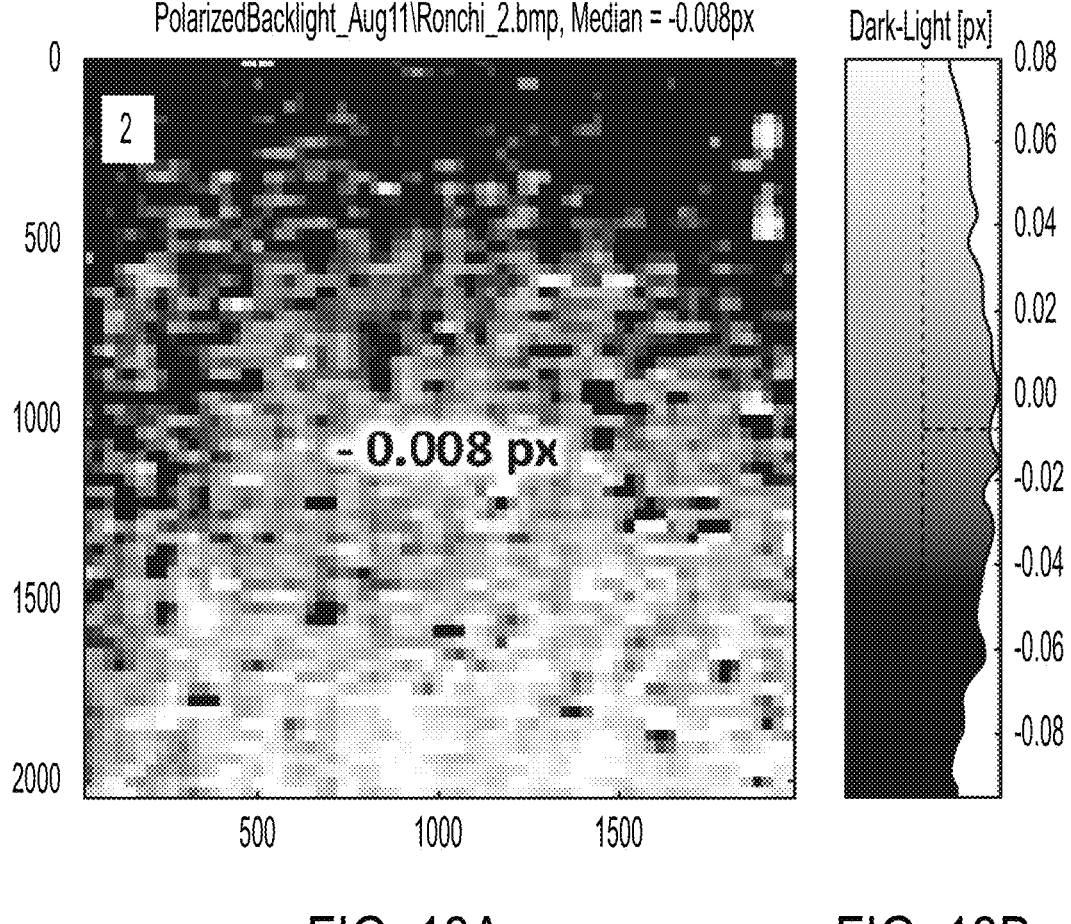

FIG. 13A is a grayscale representation of a color heatmap of edge shifts provided with a median dark width minus light width error of −0.008px taken from a video measuring system being tuned using a first and second linear polarizer shown in FIG. 6 and rotating the second linear polarizer relative to the first linear polarizer to provide the image of the backlight distribution designed as 2 in FIG. 9.

FIG. 13B is a grayscale representation of a color histogram of values showing the median dark width minus light width error of −0.008px taken from a video measuring system being tuned using a first and second linear polarizer shown in FIG. 6 and rotating the second linear polarizer relative to the first linear polarizer to provide the image of the backlight distribution designed as 2 in FIG. 9.

FIG. 14A is a grayscale representation of a color heatmap of edge shifts provided with a median dark width minus light width error of +0.196px taken from a video measuring system being tuned using a first and second linear polarizer shown in FIG. 6 and rotating the second linear polarizer relative to the first linear polarizer to provide the image of the backlight distribution designed as 3 in FIG. 9.

FIG. 14B is a grayscale representation of a color histogram of values showing the median dark width minus light width error of +0.196px taken from a video measuring system being tuned using a first and second linear polarizer shown in FIG. 6 and rotating the second linear polarizer relative to the first linear polarizer to provide the image of the backlight distribution designed as 3 in FIG. 9.

Figures 15A, 15B, 15C:
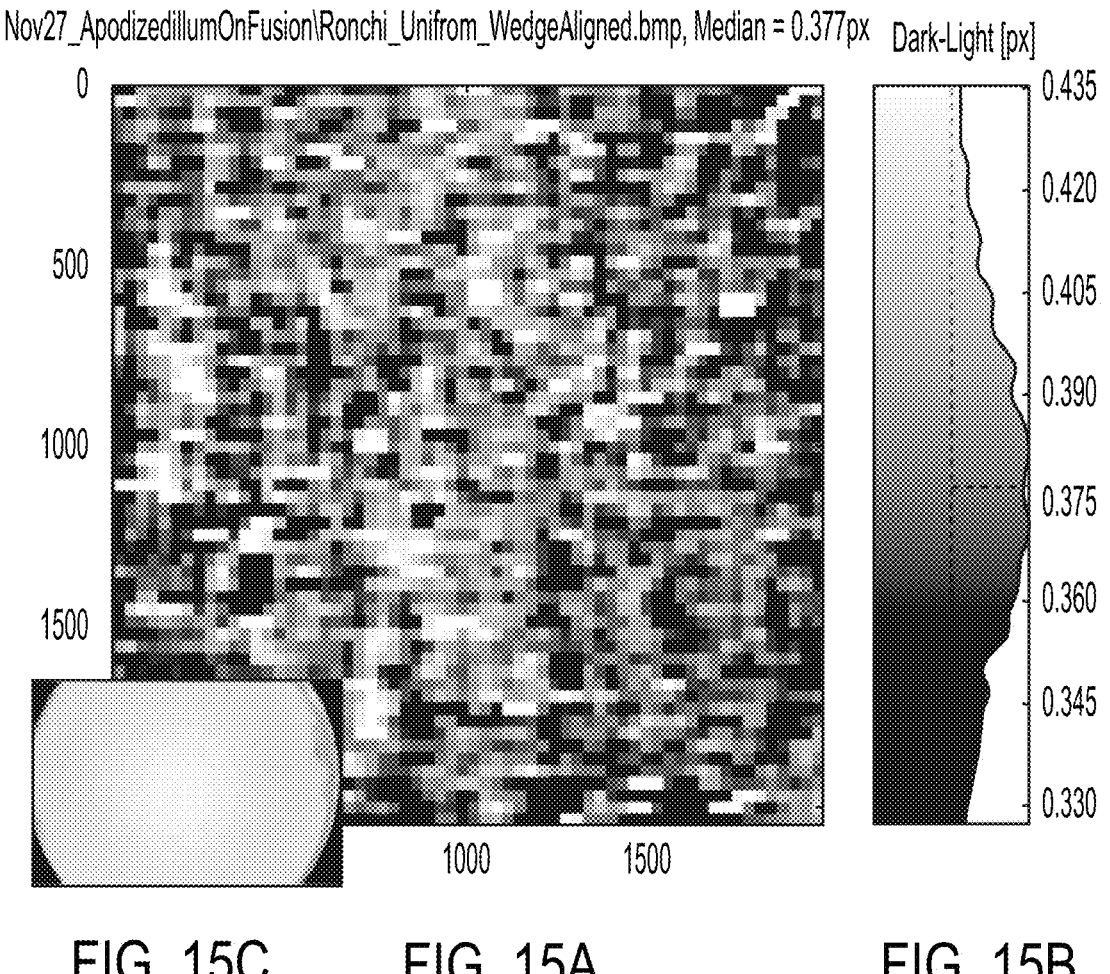

FIG. 15A is a grayscale representation of a color heatmap of edge shifts provided with a median dark width minus light width error of +0.377px taken from a video measuring system without a light obscuration apparatus.

FIG. 15B is a grayscale representation of a color histogram of values showing the median dark width minus light width error of +0.377px taken from a video measuring system without a light obscuration apparatus.

FIG. 15C is an image of the backlight distribution shown in grayscale which created the plot shown in FIG. 15A.

FIG. 16A is a grayscale representation of a color heatmap of edge shifts provided with a median dark width minus light width error of +1.032px taken from a video measuring system without a light obscuration apparatus where the illumination source is not properly collimated.

FIG. 16B is a grayscale representation of a color histogram of values showing the median dark width minus light width error of +1.032px taken from a video measuring system without a light obscuration apparatus where the illumination source is not properly collimated.

Figure 17:
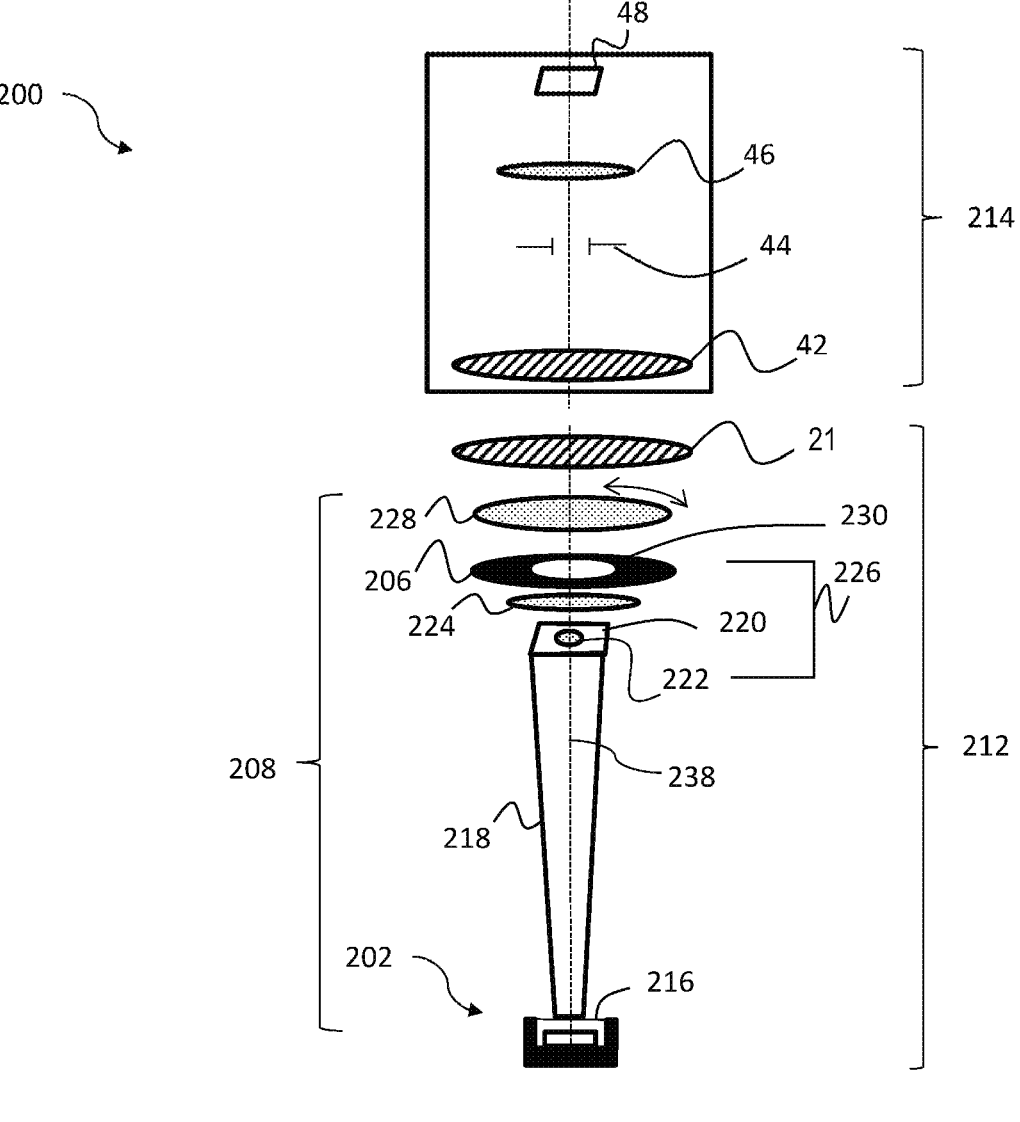

FIG. 17 is an expanded view of a video measuring system having a light obscuration system for backlighting a test object.

Figure 18:
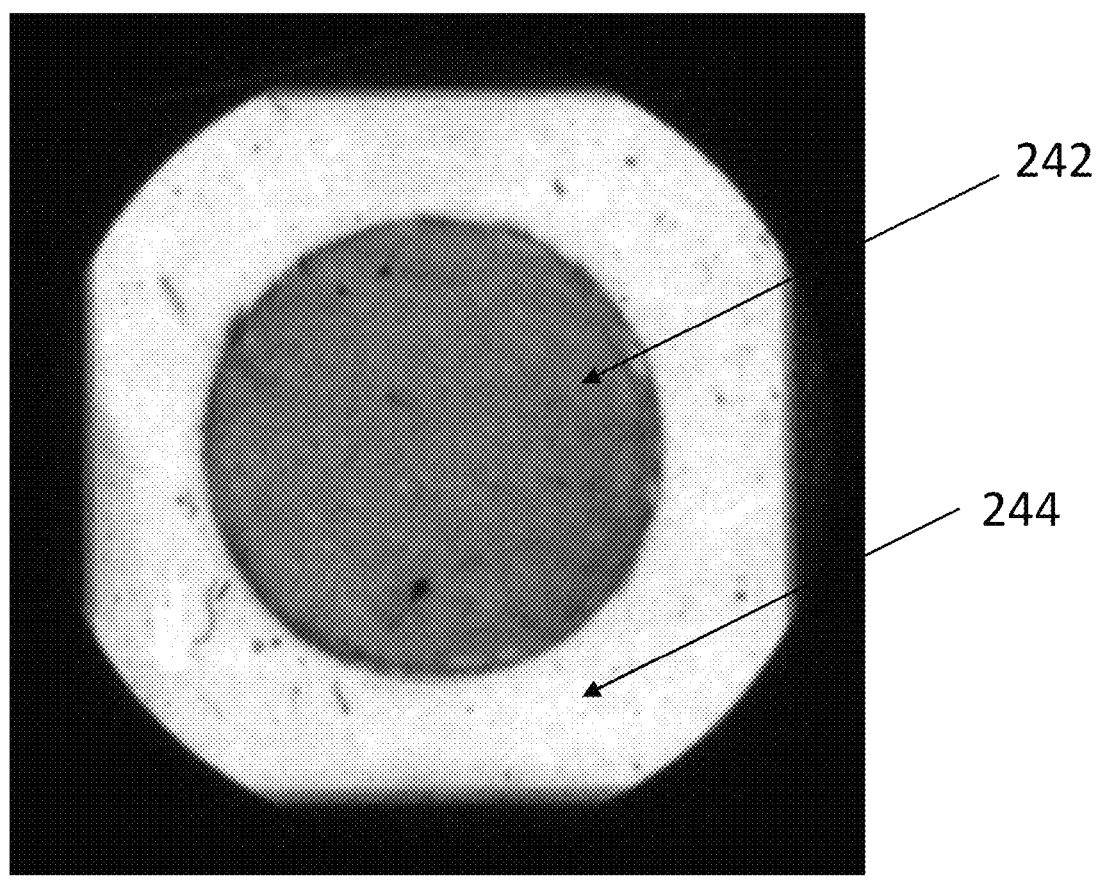

FIG. 18 is a photograph of a field of view showing the effects of the second linear polarizer overlapping the small linear polarizer.

Figure 19:
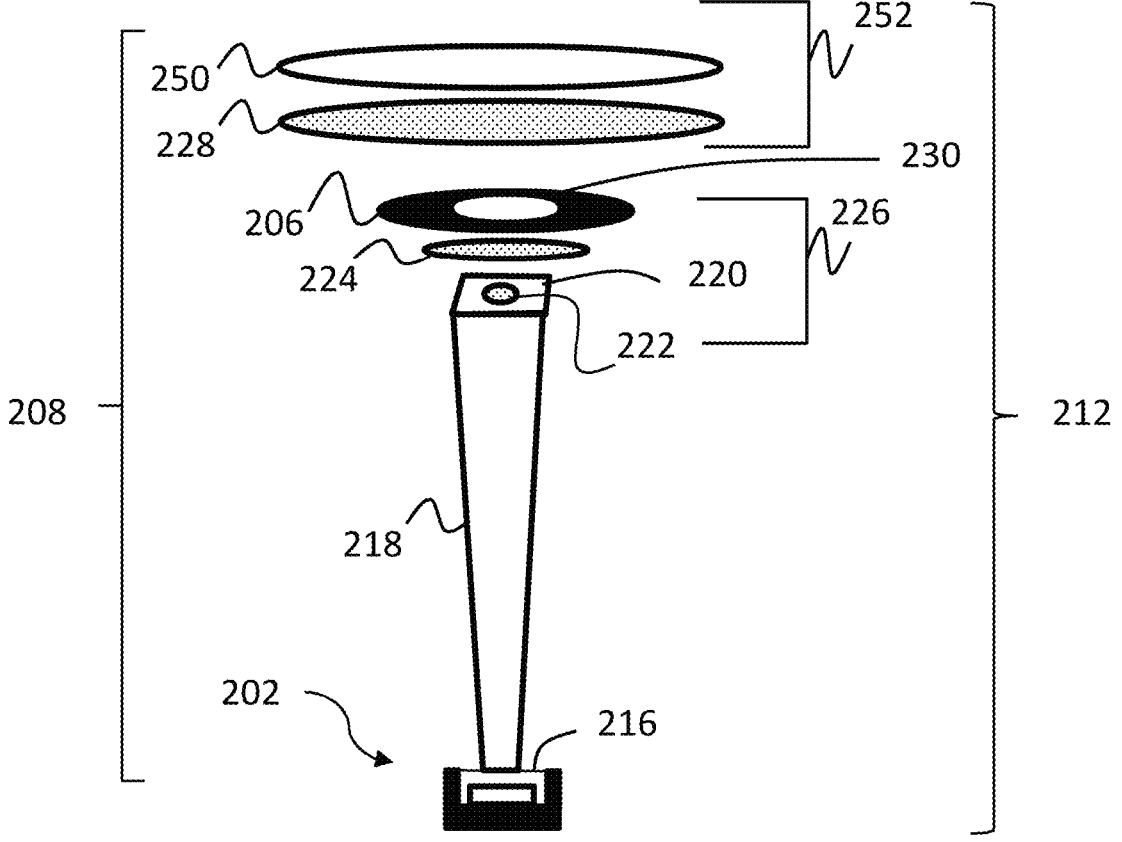

FIG. 19 is an expanded view of the light obscuration system of FIG. 17 showing a waveplate as part of the light obscuration system.

Figure 20:
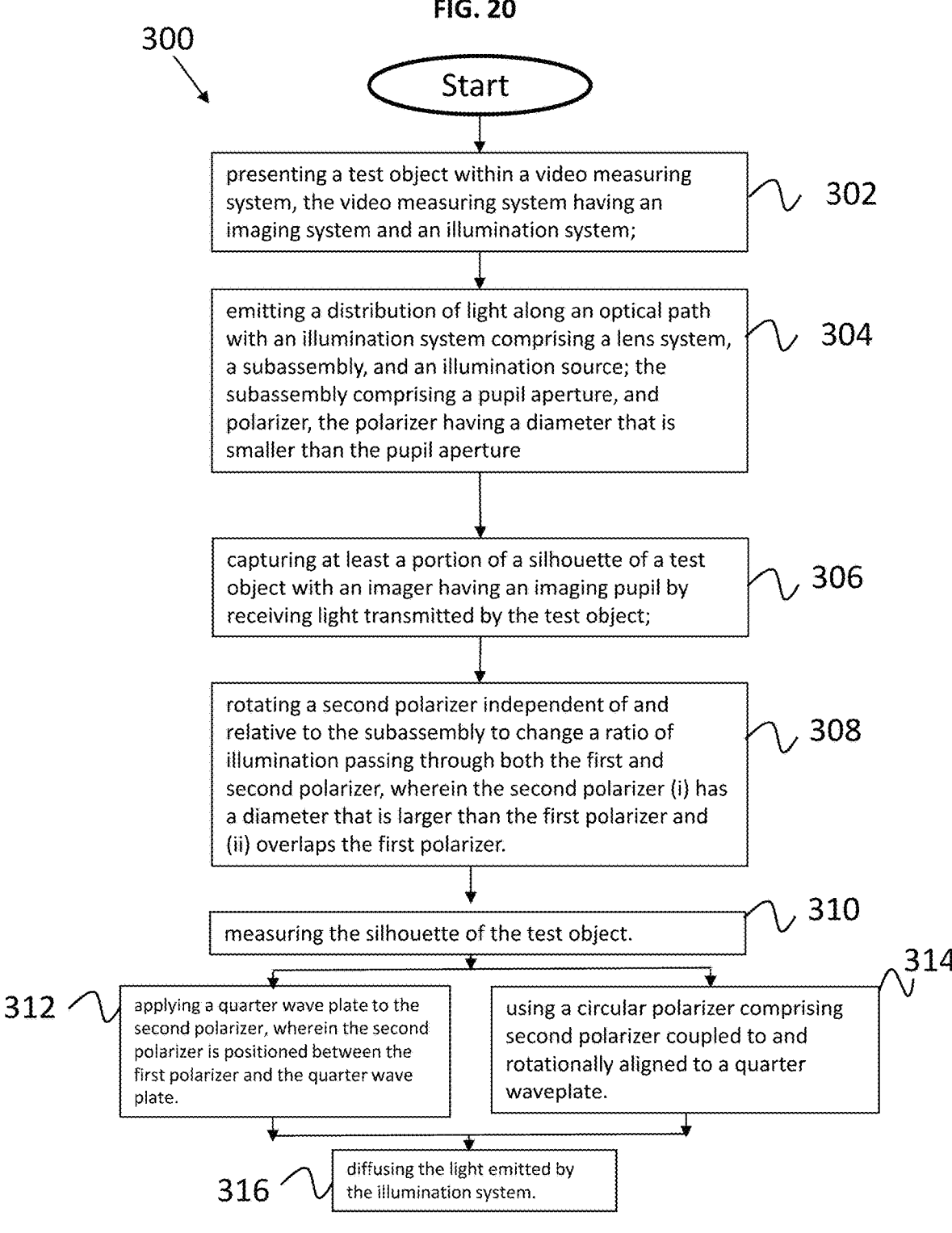

FIG. 20 is a flow diagram disclosing a method of the present invention.

DETAILED DESCRIPTION OF THE INVENTION

At the outset, it should be appreciated that like reference numbers are intended to identify the same structural elements, portions, or surfaces consistently throughout the several drawing figures, as such element, portions or surfaces may be further desired or explained by the entire written specification, or which this detailed description is an integral part. Unless otherwise indicated, the drawings are intended to be read together with the specification, and are to be considered a portion of the entire written description of this invention.

Figure 1:
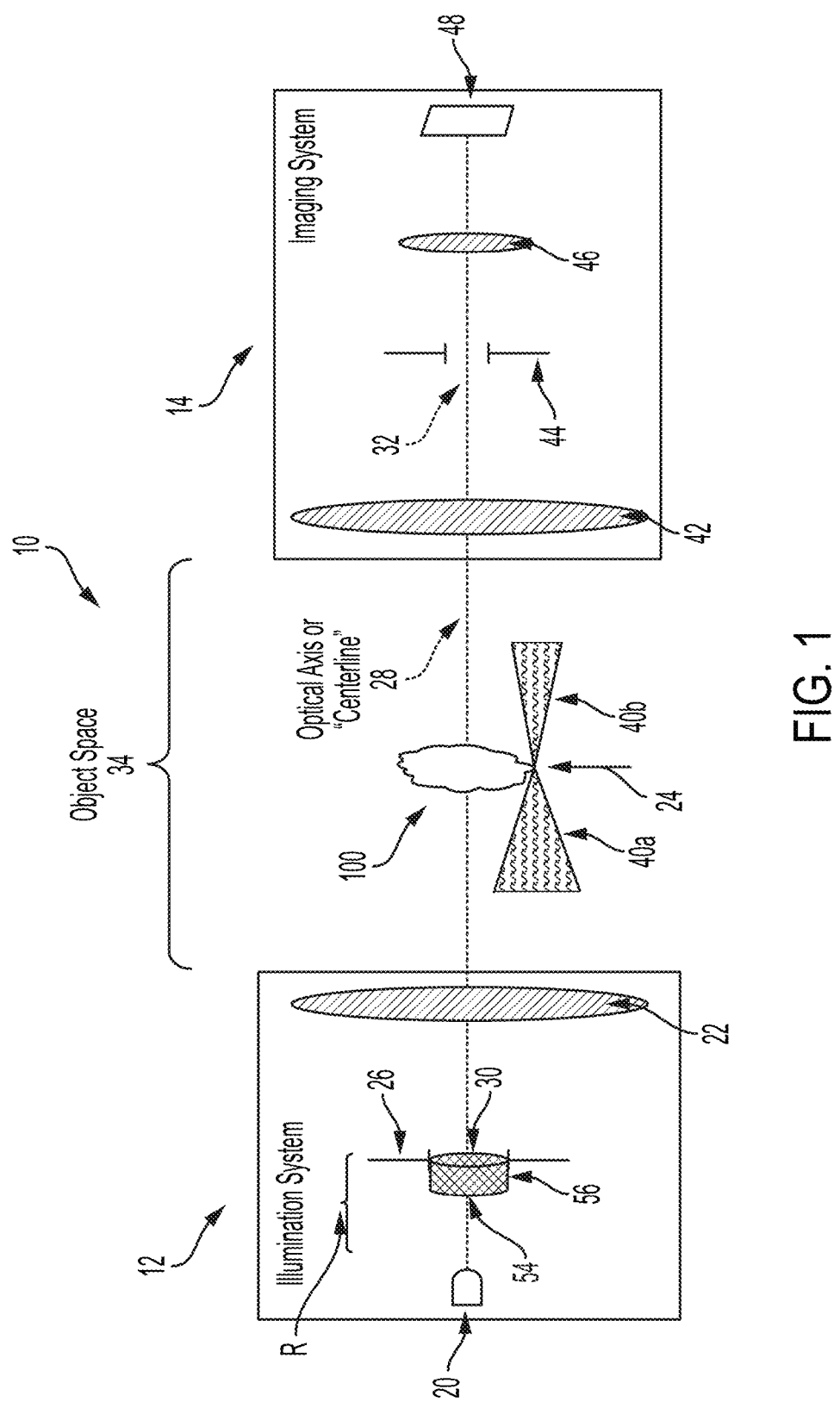
FIG. 1 is a diagram of a video measuring system for backlighting a test object having an illumination system and an imaging system arranged for capturing the silhouette of the backlit test object, wherein the angular extent of the backlight is larger than the angular extent received by the imaging pupil.
Figure 2:
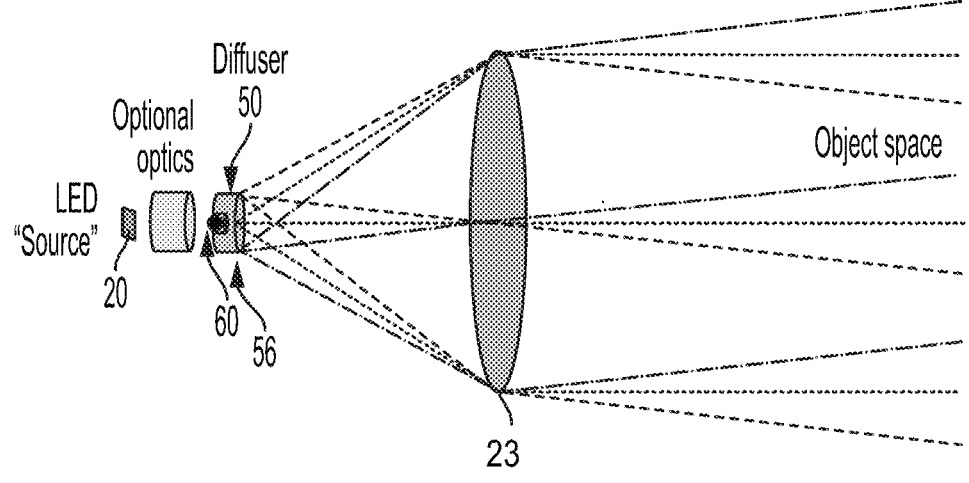
FIG. 2 is a diagram of an illumination system of the video measuring system for backlighting a test object.
Figure 3:
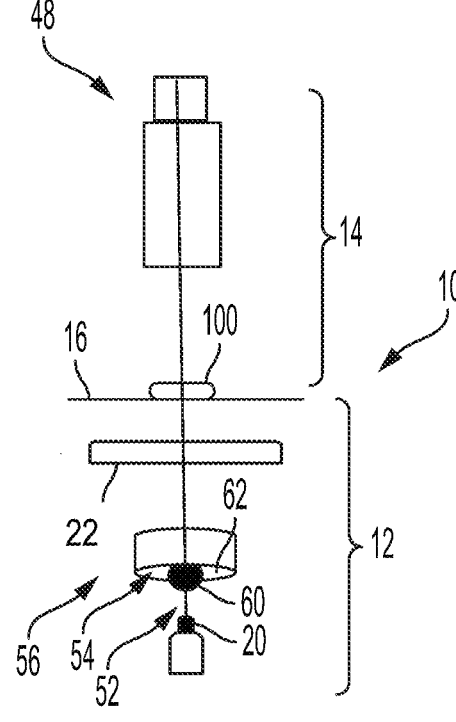
FIG. 3 is a diagram of a video measuring system for backlighting a test object showing the test object on a mounting stage.

The video measuring system 10 shown in FIGS. 1-3 is presented in a schematic layout featuring an illumination system 12 for backlighting a test object 100 and an imaging system 14 arranged for measuring a silhouette of the test object 100. Measuring the silhouette of backlit test objects is known as "shadow imaging" or "silhouette imaging." The video measuring system 10 for opaque parts is one of many possible configurations, which includes a test object 100 positioned on a mounting stage 16. The mounting stage 16 can be made of transparent optical material or otherwise provide for the transmission of light to convey light past the test object 100 to the imaging system 14. The test object 100 is backlit by the illumination system 12 having an illumination source 20 and an illumination lens 22. Although one illumination lens element is shown, it should be appreciated that additional illumination elements may be included in a configuration. Typically, the illumination lens 22 is a collimation lens 23 providing collimated rays, for example, as shown in FIG. 2. The illumination system 12 further includes an illumination pupil 26. The illumination system 12 in one configuration is aligned with an optical axis or "centerline" 28 of the video measuring system 10. The imaging system 14 is arranged for detecting transmitted light from the illuminator on the opposite side of the test object 100, known as diascopic illumination.

The imaging system 14 includes at least an imager, for example, an arrayed image sensor 48, which can be aligned along a common optical axis 28 of the video measuring system 10. The illumination system 12 includes a relatively high angular extent compared to the imaging system 14. The imaging system 14 further includes at least one imaging front-end lens 42 and an imaging pupil 44. The imaging system 14 also includes a rear lens 46 and an arrayed image sensor 48 in the image plane. The front-end lens 42, together with the collimating lens 23, images the illumination pupil 26 of the illumination system 12 onto the imaging pupil 44 of the imaging system 14. The silhouette of the test object 100 is collected from a wider range of off-axis angles, but opportunities for stray deflections from the test object 100 to enter the imaging pupil are limited because the imaging system 14 has an object space numerical aperture that is smaller than the object space numerical aperture of the illumination system 12. Using this video measuring system 10, the illumination output 24 has an angular extent 40*a* in object space 34 that is larger than the angular extent 40*b* received by the imaging pupil 44. In one configuration, the angular extent 40*a* of the illumination source 20 in object space 34 is approximately twice as large as the angular extent 40*b* received by the imaging pupil 44. It should be appreciated that the illumination pupil 26 and the imaging pupil 44 are in at least approximately conjugate image planes, and typically are in conjugate image planes. The illumination pupil 26 and the imaging pupil 44 each include an axial centerline 30, 32, respectively, which aligns with the optical axis 28 of the video measuring system 10.

The illumination source 20 can include a standard back-light having a high angular extent. The angular extent of the illumination source 20 in object space in one configuration is approximately twice as large as the angular extent received by the imaging pupil 44. The backlight object space f-number (F/#) may be about half that of the associated imager. For example, the illumination system 12 may have an object space F/50 while the imaging system 14 may have an F/100. The illumination source 20 in one configuration may be a light emitting diode (LED) or a plurality of LEDs. In another configuration, the illumination source 20 is an incandescent lamp, high intensity discharge (HID) lamp, or superluminescent diode (SLD or SLED). The illumination system 12 further includes a substrate 50 arranged to diffuse light from the illumination source 20. The substrate 56 is preferably at least approximately aligned with the optical axis 28 and even more preferably the substrate 56 is a diffuser 50 aligned with the optical axis 28. The illumination system 12 also includes a light obscuration apparatus 18 comprising the substrate 56 and a light obscuration element 52 which is arranged to dim the part of the illumination distribution that is directly captured by the imaging system 14. In one configuration, the light obscuration element 52 is at least approximately coaxial to the axial centerline 30 of the illumination pupil 26, and more preferably coaxial to the axial centerline 30 of the illumination pupil 26. Even more preferably, the imaging pupil 44, light obscuration element 52 and illumination pupil are coaxial to the optical axis 28. As described below, most preferably, the imaging pupil 44 is centered on the dark spot formed by the light obscuration element 52. It should be appreciated that the substrate 56 and light obscuration element 52 can be located within a region of axial positions "R" positioned between the illumination source 20 and the illumination pupil 26.

The light obscuration apparatus 18 comprising the light obscuration element 52 and substrate 56 can take many different configurations. Many examples of the light obscuration element 52 and the substrate 56 are described below. It should be appreciated that each of the illumination distribution arrangements described emits light that is not directly captured by the imaging optical system. Further, it should be appreciated that the illumination system may optionally include additional optics between the illumination source 20 and the substrate 56.

As shown in FIGS. 1-4B, the substrate 56 can be a volumetric diffuser 50. The term "diffuse" or "diffusing" means light scattering, for example by reflection, refraction or diffraction. A volumetric diffuser 50 is generally a substrate that scatters light throughout the volume of the bulk material. An example of a volumetric diffuser 50 is a white acrylic sheet such as Acrylite 020-4, Plexiglass 2447, or similar material. However, it should be appreciated that other suitable materials are possible, and these are intended to be within the spirit and scope of the invention. Additionally, in a configuration, the volumetric diffuser 50 includes diffuse front and/or back surfaces. In another configuration, the volumetric diffuser 50 has polished or buffed surfaces.

In another configuration, the illumination system includes a substrate 56 that is a dual-sided non-volumetric diffuser, or surface diffuser. By "surface diffuser" it is meant to refer to a substrate where the points of scattering are confined to a surface, usually due to a rough surface finish on an exterior surface. Examples of "surface diffusers" include, but are not limited to, a piece of clear glass with rough ground front and back surfaces and a single-sided surface diffuser.

The light obscuration element 52 is arranged for apodizing the illuminator pupil 26 by providing a darker center and brighter annulus near the pupil edge. The light obscuration element 52 and substrate 56 control the angular distribution of light emitted from the illumination system 12. It should be appreciated that rotational symmetry within the imaging pupil 44 is important, especially when the object is out of best focus, to avoid anisotropic measurement errors.

Figure 4A:
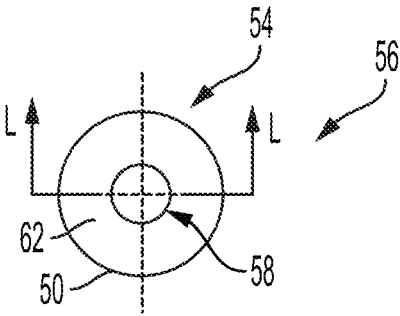
FIG. 4A is an enlarged top view of a front side of a volumetric diffuser having a light obscuration element within a bore.
Figure 4B:
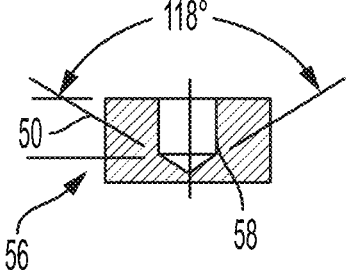
FIG. 4B is a cross-sectional view of the volumetric diffuser having a bore taken along line L-L of FIG. 4A.

One effective way of achieving distributions is using a thick volumetric diffuser 50 which is illuminated from the front side 54 uniformly, wherein a bore 58 is drilled into the center of the diffuser material and a ball 60 is disposed in the bore 58 as shown in FIGS. 4A-4B. The volumetric diffuser 50 preferably has a thickness in the range of 2 mm to 6 mm and a diameter in the range of 3 mm to 7 mm. In one configuration, the volumetric diffuser 50 has a thickness of 2.9 mm with a diameter of 5.65 mm. The ball 60 is sized to fit within the bore 58 and is typically approximately the same size as the bore 58 with tolerances that result in minimum gap sizing. In one configuration, the diameter of the bore 58 is between 1 mm and 5 mm, and more preferably between 1.5 mm and 3 mm, with a cylindrical shape. The bore 58, in certain configurations, further includes a tapered edge or cone-shaped bottom. In one configuration, the bottom is a right cone shape having an apex angle of approximately 118°. In some configurations, the depth of the bore 58 is smaller than the diameter of the ball 60. Thus, the ball 60 can in some configurations, protrude from the surface of the diffuser 50 when disposed within the bore 60. For example, the ball 60 may protrude between 0.1 mm and 0.4 mm from the front surface 62 of the diffuser 50 in one configuration, and more preferably between 0.2 mm and 0.3 mm. It should be appreciated that while a spherical, steel ball bearing is shown as the light obscuration element 52, other materials can be used and other shapes that fit within the bore 58 of the diffuser are possible. The geometry of the light obscuration element 52 may need to change depending on the properties of a specific diffuser material to produce a suitable distribution. The light obscuration element 52 can be any type of material or shape that blocks some or all of the light proximate or at the center of the illumination pupil 26. In one configuration, the ball is approximately spherical. If the diffuser 50 is volumetric and the ball 60 is not directly seen on the output side of the diffuser 50, the resulting distribution typically does not provide abrupt changes in the light intensity. The adjusting of the depth of the bore 58 as well as the diameter of the bore 58 provide control parameters for the resulting illumination distribution. The bore 58, in a configuration, is coaxial to an axial centerline of the diffuser 50. Moreover, the ball 60 and bore 58 are each at least approximately coaxial to the axial centerline of the illumination pupil 26 and imaging pupil 44, and more preferably, coaxial to the axial centerline of the illumination pupil 26 and imaging pupil 44.

It should be appreciated that other single static central obscuration components that provide less than 100% transmittance can be used instead of or in addition to the ball. Further, other light obscuration elements can be used, including, but are not limited to, rod stock, a deposited metal dot (for example, chrome on glass), shim stock disc, black paint filling in the diffuser bore, a metal foil disc, etc.

In a configuration, the substrate 56 is part of an illumination system assembly, wherein the illumination source 20 is on one side of the substrate 56 and the illumination lens element(s) 22 are on the other side.

Figure 5:
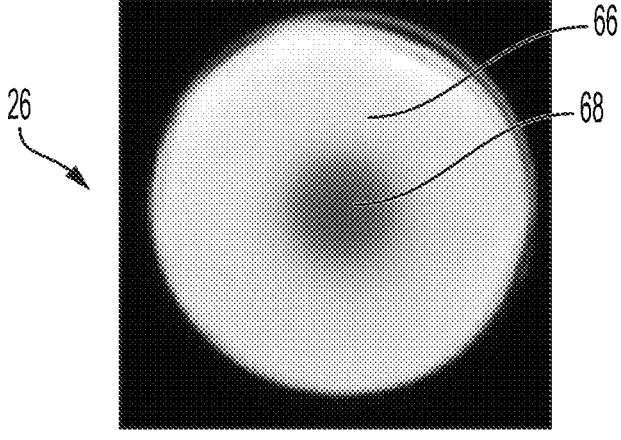
FIG. 5 is an image of an illumination distribution using the light obscuration element within the bore of FIG. 4A.

Turning to FIG. 5, this figure shows an image of an illumination distribution using the light obscuration element within the bore of FIG. 4A. It should be appreciated that while the imaging system 14 can be aligned with the illumination source 20 along an optical axis 28 such that the circular imager acceptance region is centered in the illumination distribution, having the imaging system 14 aligned with the illumination source 20 is not required. The light obscuration element 52 provides a brighter annulus 66 near the edge of the illumination pupil 26 and a dark spot 68 near the center. The light obscuration element 52 may be approximately centered to the sharp outer edge, or there may be no sharp outer edge. Preferably, however, the imaging pupil 44 is centered on the dark spot 68 formed by the light obscuration element 52.

Figure 7:
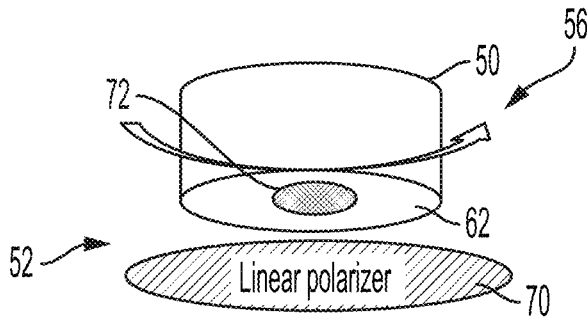
FIG. 7 is an enlarged diagram of a light obscuration element using a first and second linear polarizer, wherein the second linear polarizing filter is disposed on the front surface of the diffuser.
Figure 8:
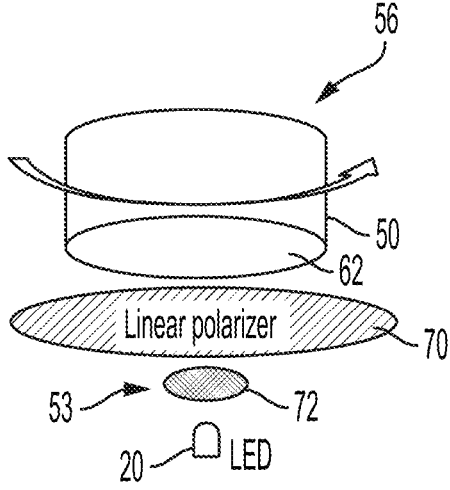
FIG. 8 is an enlarged diagram of a light obscuration element using a first and second linear polarizer, wherein the second linear polarizing filter is located between the illumination source and the first linear polarizing filter.

In another approach, an illumination distribution is achieved by a light obscuration apparatus 18 that apodizes the illumination pupil 26 using a pair of linear polarizing filters as shown in FIGS. 6-8. The intended effect of adjustable edge shift is achieved by rotating one of the polarizing filters relative to the other polarizing filter.

In one configuration, the light obscuration element 52 is a pair of linear polarized filters 70, 72. As shown in FIG. 6, linear polarizing filter 70 is located between the illumination source 20 and the front surface 62 of the substrate 56 and linear polarizing filter 72 overlaps linear polarizing filter 70. The illumination system 12 of this configuration includes an illumination source 20 as described above, a substrate 56, a first polarizing filter 70 and a second polarizing filter 72 where one of the polarizing filters 70 or 72 is at a different, adjustable orientation and rotated in relation to the other linear polarizing filters 70 or 72 to provide a darker center and brighter annulus near the edge of the illumination pupil 26. Typically, linear polarizing filter 72 has a diameter that is smaller than the illumination pupil 26 to dim the corresponding central portion of the distribution by an adjustable amount and at least approximately coaxial to the axial centerline of the illumination pupil 26. Moreover, typically linear polarizing filter 72 has a diameter that is larger than the imaging pupil 44. In a configuration, the substrate 56 is a diffuser 50. Linear polarizing filter 72, in one configuration, is disposed on the back surface 74 of the substrate 56 as shown in FIG. 6. Linear polarizing filter 72 in this configuration is disposed on the substrate 56 itself. Linear polarizing filter 72 may be taped or otherwise adhered to the back surface 74 of the substrate 56 in a manner that does not completely obstruct the transmission of light. Methods of securing the linear polarizing filter 72 to the diffuser include, but are not limited to, optically clear adhesive, clear tape, press-fitting into a hole in the substrate 56, for example, the diffuser 50, etc. In fact, linear polarizing filter 72 need not be physically attached to the diffuser 50 at all, though the diffuser 50 makes for a convenient substrate. The transmission of light through linear polarizing filter 72 is then adjusted by rotating the diffuser 50. For example, the linear polarizing filter 72 can be rotated in about 10 degree increments.

In another configuration according to FIG. 7, linear polarizing filter 72 is positioned between polarizing filter 70 and the substrate 56. In yet another configuration, as shown in FIG. 8, linear polarizing filter 72 is between the illumination source 20 and linear polarizing filter.

Figure 10:
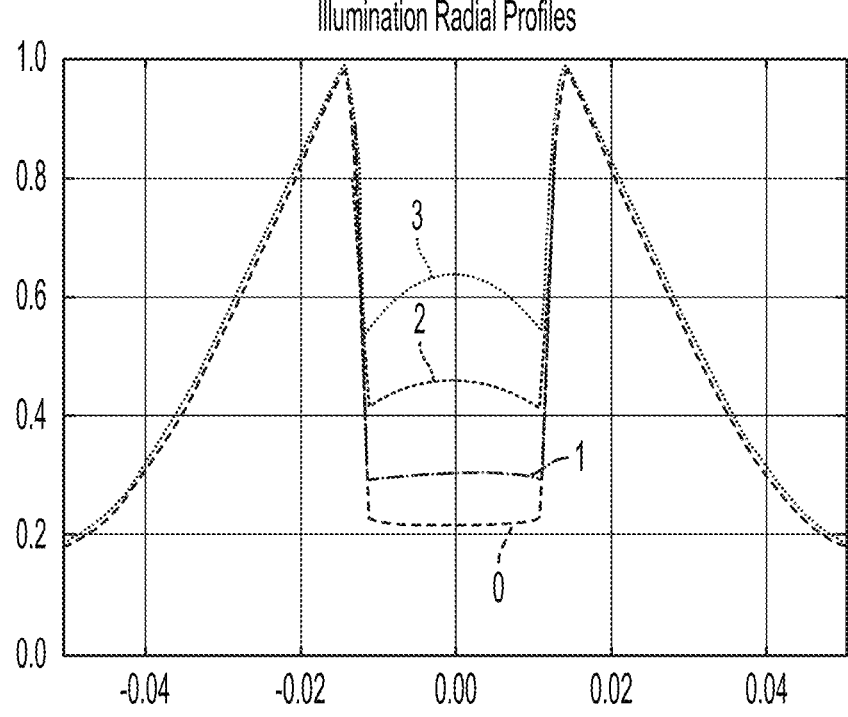
FIG. 10 is a graph of the approximate corresponding illumination radial profiles of the distributions which were extracted via digital image analysis.

Turning now to FIGS. 9 and 10, FIG. 9 is a set of images of the distributions shown in grayscale, the images obtained from an exemplifying use of linear polarizing filters 70, 72 shown in FIG. 6 and rotating linear polarizing filter 72 relative to linear polarizer 70. FIG. 10 is a graph of the approximate corresponding illumination radial profiles of the distributions which were extracted via digital image analysis. In this graph, the x-axis is the distance from the distribution's center and the y-axis is the relative intensity at each radial position. Here, in this example, linear polarizing filter 72 had a diameter that was slightly larger than the imaging pupil 44, was taped to the diffuser 50, and rotated in about 10 degree increments (labeled 0, 1, 2, and 3) starting at the least transmissive rotational position until the edges in the images of a test object 100 did not appear shifted. In this configuration, the linear polarizing filter 72 was aligned by eye to the center of the bright portion of the distribution created by the illumination source 20 by translating the diffuser 50. Images of the distributions themselves are shown below in grayscale, labeled 0, 1, 2, and 3, and the central portion 80 can be observed getting lighter as the diffuser 50 is rotated. Maps of edge shifts, as shown in the grayscale representations of color heatmaps in FIGS. 11A, 12A, 13A, and 14A, are provided with the median dark width minus light width error displayed in text on the corresponding plots. The error map plots described herein of XFIGS. 11A, 12A, 13A, and 14A show a two-dimensional data visualization using a selected gradient, wherein values of the difference between the dark stripe widths and the adjacent and bright stripe widths are given assignments along the grayscale based on the greatest and least values calculated in the dark width minus light width calculation. In a color heatmap version of the images in FIGS. 11A, 12A, 13A, and 14A, the different colors along the RGB scale correspond with the levels of brightness of the grayscale. More specifically, in one configuration of the color heatmap version of the images in FIGS. 11A, 12A, 13A, and 14A, the largest dark minus light pixel value is represented by red, a median pixel value is represented by green, and the smallest dark minus light pixel value is represented by violet.

Additionally, a histogram of values is shown in FIGS. 11B, 12B, 13B, and 14B, respectively. FIGS. 11B, 12B, 13B, and 14B each depict a histogram in grayscale using different levels of brightness to represent colors along the RGB scale. In color versions of the grayscale histograms shown in FIGS. 11B, 12B, 13B, and 14B, different colors along the RGB scale correspond with the levels of brightness of the grayscale. More specifically, in color versions of the grayscale histograms described herein, the histograms classify colors in the color error map, showing the spread of values along the RGB scale from the highest dark minus light value, which can be represented by red at the top of the dark minus light pixel histogram, median dark minus light value which can be represented by green and located approximately near the horizontal line on the histogram, to lowest dark minus light which can be represented by violet at the bottom. The method used to measure the magnitude of edge shift on an existing video measuring system 10 is as follows.

First, a chrome on glass Ronchi ruling with a verified 50% duty cycle is placed in the focus of the imaging system 14 and an image is captured. Next, the digital image is analyzed by finding a variety of edge positions, preferably using the same edge finding method that will be used when measuring real parts. Edge positions throughout the image (i.e. the system's field of view or FoV) are found and the difference between the dark stripe widths and the adjacent and bright stripe widths is determined. If the difference is not zero, there is some edge shift that changes direction with the edge orientation. Next, the dark stripe width minus an adjacent light stripe width is mapped throughout the field of view of the imaging optics, which is used to generate a false-color map of error magnitude. The median of all dark minus light values is considered to reduce this to a single value. In the analysis output figure, FIG. 15A, for example, the median of all dark minus light values is 0.377 px. Additionally, a histogram of values is shown in FIG. 15B, wherein the highest dark minus light value was 0.435 px, shown in light gray in FIG. 15B, the median was 0.377 px shown in medium gray located in the area of the horizontal line, and the lowest dark minus light value was 0.330 px shown in dark gray at the bottom of the histogram. In one configuration of a color version of the histogram depicted in 15B, the highest dark minus light value of 0.435 px can be shown in red at the top, the median of all dark minus light values of 0.377 px can be shown in green located in the area of the horizontal line, and the lowest dark minus light value of 0.330 px can be shown in violet at the bottom of a color version of the histogram. This shows the spread of values in the plot, which can help indicate a problem, e.g. the range of edge shift values is significantly higher than other machines of the same design.

Considering partial coherence effects, traditional illuminators tend to shift the edge from dark to light, so the dark stripes tend to appear wider than neighboring light stripes. Therefore, the dark-light values tend to be positive. As an example of this tendency, FIG. 15A is a grayscale representation of a color error map as described above, taken from a multisensory video measuring machine with a backlight. An image of the backlight distribution that created this plot, FIG. 15C, is also included in the bottom left hand corner of the analysis output figure.

Having the edge shift measured throughout the FoV is useful for diagnosing inconsistent illumination angular distribution or inconsistent alignment between the illuminator system 12 and the imager system 14. For example, if the illumination source 20 (also referred to as the backlight) is not properly collimated, a field-dependent error map is possible. Similarly, if the arrayed image sensor 48 is not telecentric but the backlight is properly collimated, a pattern can be visible in the error map in the presence of partial coherence edge shift effects. A field-dependent pattern indicates a problem in the system, but does not specify the root cause. FIGS. 16A and 16B show an example of a field dependent error map. In the analysis output figure, FIG. 16A, the median of all dark minus light values is +1.032px. Additionally, a histogram of values is shown in FIG. 16B, wherein the highest dark minus light value was 1.100 px, which is shown in light gray, the median was 1.032 px, which is shown in medium gray, and the lowest was 0.925 px, which is shown in dark gray. In one configuration of a color histogram version of FIG. 16B, the highest dark minus light value of 1.100 px can be shown in red at the top, the median of all dark minus light values of 1.032 px can be shown in green located in the area of the horizontal line on the histogram, and the lowest dark minus light value of 0.925 px can be shown in violet at the bottom.

Other edge orientations can be tested by rotating the Ronchi ruling before capturing and image and running the analysis. Since a well-aligned system is expected to have isotropic partial coherence edge shift, a single orientation can be cautiously used as a measure of this aspect of machine performance.

This method has an advantage of not needing an accurate (or any) physical pixel size, so at a minimum, the magnification of the video measuring machine 10 need not be calibrated. This is because the found edge positions are referenced to other found edge positions in the same image. The only thing that is needed is an artifact with a verified 50% duty cycle, for example, a chrome on glass Ronchi ruling. In order to convert the edge shifts from units of pixels into physical distance, an object space pixel size is needed, but a good approximation of this parameter is usually adequate for this purpose.

Since the measurement is the dark width minus light width, the isotropic edge shift is counted several times (two widths at two edges per width). If we assume the edge shift is constant, the shift of any individual edge can be calculated simply by dividing the dark-light value by 4. Another convenient calculation is that objects whose widths are measured will typically have an error of half the dark minus light value since a width constitutes two measured edges.

Thus, using the above method to measure the magnitude of edge shift on an existing video measuring system with an illumination system 12 tuned using a light obscuration apparatus 18 described herein to remove partial coherence edge shift, the map of edge shifts as shown in the grayscale representations of the color heatmaps in FIGS. 11A, 12A, 13A, and 14A, show a measured edge shift was closest to zero (0.008 pixels), and therefore having the most desirable corrective factor, for configuration 2 shown in FIG. 13A.

If polarized illumination creates issues for measurement of certain artifacts, a wave plate may be used after linear polarizing filters 70 and 72 to mitigate such effects by creating non-linear output polarizations.

It should be appreciated that alternative configurations of the pair of linear polarizing filters approach may be used. For example, oversizing linear polarizing filter 72 to be significantly larger in diameter than the imaging pupil 44 could ease alignment sensitivity while maintaining enough adjustment to correct the edge shift the desired amount. Alternatively, linear polarizing filter 72 could be placed on the side of the diffuser 50 that is closer to the illumination source 20, thus softening any features in the output distribution via action of the diffusive substrate.

Finally, a mechanism (not shown) to rotate linear polarizing filter 70 may be used instead of rotating the diffuser 50 having linear polarizing filter 72 since rotation of the diffuser 50 can throw the system out of alignment, including but not limited to the alignment of the linear polarizing filter 72 to the illumination source 20, the linear polarizing filter 72 to the imaging system 14, or both.

As illustrated in FIG. 17, a light obscuration system 208 is part of a video measuring system 200 having an illumination system 212 for backlighting a test object 100 (shown in FIG. 3) and an imaging system 214 arranged for measuring a silhouette of the test object 100. The imager 48 is arranged for viewing at least a portion of the silhouette of the test object 100 by receiving light transmitted by the test object 100 over an angular extent. The illumination system 212 includes an illumination source 202, which is a backlight, and a light obscuration system 208. The light obscuration system 208 further includes a pupil aperture 206. In one configuration, the illumination source 202 is a light emitting diode (LED) or a plurality of LEDs. In another configuration, the illumination source 202 is an incandescent lamp, high intensity discharge (HID) lamp, or superluminescent diode (SLD or SLED). As shown in FIG. 17, the illumination source 202 is an LED die, which may include a transparent window 216. The LED die in one configuration is smaller than the pupil aperture 206.

The light obscuration system 208 may optionally include a light pipe 218 having an entrance opening or surface (not shown) and an exit surface 220. The light pipe 218 transmits light with minimal loss. In one configuration, the light pipe 218 is tapered. The taper in the light pipe 218 changes the area of light and the angle of light with minimal loss of brightness. Thus, a larger output area is provided by the light pipe 218 having a narrower entrance opening or surface than the exit surface 220 while maintaining or enhancing illumination uniformity. Although a light pipe 218 having a substantially square tubular shape and substantially square exit surface 220 is shown, it should be appreciated that the light pipe 218 may have other tube shapes, including but not limited to round, round/square, rectangular, hexagonal, and oval. Typically, the light pipe 218 is fabricated from solid glass or is hollow and may be filled with air, however, it should be appreciated that the light pipe 218 may be made of other optical grade materials. In certain configurations, the inner walls of the light pipe are polished metal, metalized glass, or plastic mirror surfaces. For example, the light pipe 218 may be fabricated from optical acrylic or polycarbonate materials. The tapered light pipe 218 provides a larger output area while narrowing angular extent and maintaining or enhancing illumination uniformity at the ext surface 220.

As shown in FIG. 17, a small polarizer 222 is adhered directly to the exit surface 220 of the light pipe 218. For example, an optical adhesive, such as Norland Optical Adhesive 86 or NOA 86 may be used to bond the small polarizer 222 to the exit surface 220. In one configuration, the small polarizer 222 is a small linear polarizer. An example of a small linear polarizer that can be used is AP50-007T available at American Polarizers Inc. The small polarizer 222 is in a fixed position relative to the optical axis 238 of the illumination system 212 and is in approximately the same plane as the pupil aperture 206. The image conjugate of imaging pupil 44 at the illumination pupil aperture 206 plane is at least substantially aligned with the small polarizer 222. A diffuser 224 may additionally be disposed between the small polarizer 222 and the pupil aperture 206. The diffuser 224 in one configuration is a thin sheet of Teflon. However, it should be appreciated that other types of diffusers may be used. For example, a volumetric diffuser or a surface diffuser may be used, each as described above. Typically, the pupil aperture 206 presses against the light pipe 218. In certain configurations, the pupil aperture 206 is clamped to the light pipe 218. This applies a clamping force on the diffuser 224 to hold it in place. Thus, the diffuser may be, but is not required to be optically adhered to the exit surface 220. The light pipe exit surface 220, small polarizer 222, diffuser 224, and pupil aperture 206 are in substantially the same plane and form a subassembly 226.

In one configuration, a second polarizer 228 is spaced away from or contiguous to the subassembly 226 opposite the light pipe 218 and illumination source 202. In one configuration, the second polarizer 228 is a thin substrate (film polarizer) that is large enough in diameter to capture all the light spreading out from the pupil plane that eventually would exit the illuminator's optical system 212. That is, the second polarizer 228 laterally overlaps the small polarizer 222 and has a diameter that is larger than the small polarizer 222. In a configuration, the second polarizer 228 is laterally overlapping, but spaced along the optical axis from the small polarizer 222. Typically, the second polarizer 228 is a linear polarizer. The second polarizer 228 is attached to a mechanism (not shown) that allows it to rotate independently of and relative to the subassembly 226. Thus, as shown in FIG. 18, light going through the small polarizer 222 in the center (or approximately the center) of the pupil 230 (shown in FIG. 18 as dark area 242) can be adjusted in intensity, while the portion of the pupil 230 outside the small polarizer 222 (shown in FIG. 18 as area 244) has an intensity that is unaffected by the rotation. That is, rotating the second polarizer 228 relative to the small polarizer 222 can reduce the amount of light passing through the overlapping portions of the small polarizer 222 and the second polarizer 228 compared to the light passing through the second polarizer 228 only.

In one configuration, the second polarizer 228 is attached along its perimeter edge to the mechanism. The angular alignment between the illumination system 212 and the imaging system 214 tend to be sensitive in anti-partial coherence (APC)-enabled optical systems such as in the video measurement system 200 shown in FIG. 17 and tend to be highly dependent on alignment of the imager 48 to the central dark area 242 of the illumination distribution. That is, the imager 48 must be aligned to the small polarizer 222. Rotating the small polarizer 222 can change the lateral position of the small polarizer 222 which can change the alignment of the illumination system 212 and the imaging system 214. This could result in an alignment process that requires a greater number of iterations and much longer iteration times. Rotating the second polarizer 228 enables real-time feedback about the partial coherence edge shift without changing other aspects of the system. It can be much faster to align the system 200 if only one parameter is changed at a time. This ensures that rotating a polarizer in order to adjust the APC illumination will not change the lateral alignment of the small polarizer 222 relative to the illuminator's optical axis 238 or the pupil 44.

Turning now to FIG. 19, an light obscuration system 208 as provided in FIG. 17 is shown and includes a waveplate 250 as part of the light obscuration system 208. The light obscuration system 208 includes an illumination source 202, which is a backlight, and a light obscuration system 208 The light obscuration system 208 further includes a pupil aperture 206. In one configuration, the illumination source 202 is a light emitting diode (LED) or a plurality of LEDs. In another configuration, the illumination source 202 is an incandescent lamp, high intensity discharge (HID) lamp, or superluminescent diode (SLD or SLED). As shown in FIG. 17, the illumination source 202 is an LED die, which may include a transparent window 216.

The light obscuration system 208 may optionally include a light pipe 218 having an entrance opening or surface (not shown) and an exit surface 220. The light pipe 218 in one configuration is tapered and transmits light with minimal loss as described above.

A small polarizer 222 is adhered directly to the exit surface 220 of the light pipe 218 as further described above. In one configuration, the small polarizer 222 is a small linear polarizer. A diffusor 224, as described above, may additionally be disposed between the small polarizer 222 and the pupil aperture 206. In certain configurations, the pupil aperture 206 is clamped to the light pipe 218. This applies a clamping force on the diffuser 224 to hold it in place. Thus, the diffuser may be, but is not required to be optically adhered to the exist surface 220. The light pipe 218, exist surface 220, small polarizer 222, diffuser 224, and pupil aperture 206 are in substantially the same plane and form a subassembly 226.

A second polarizer 228 is spaced away from the subassembly 226 opposite the light pipe 218 and illumination source 202. In one configuration, the second polarizer 228 is a thin substrate (film polarizer) that is large enough in diameter to capture all the light spreading out from the pupil plane that eventually would exit the illuminator's optical system 212 as shown in FIG. 17. Typically, the second polarizer 228 is a linear polarizer. The second polarizer 228 is attached to a mechanism (not shown) that allows it to rotate independently of the subassembly 226 as described above. The waveplate 250, in one configuration is a quarter waveplate film, which is laminated to the second polarizer 228 to provide a laminated stack 252. The laminated stack 252 is sometimes referred to as a "circular polarizer." An example of a circular polarizer that can be used is APNCP50-010T-STD available at American Polarizers Inc. The circular polarizer mitigates the risk of linear polarized light causing anisotropic errors, if any. Typically, the circular polarizer 252 is oriented such that the linear polarizer layer 228 is closer to the subassembly 226 as shown in FIG. 19. Thus, the light exiting the second polarizer 228 of the circular polarizer 252 is linearly polarized with the planes of polarization of the output light being in one direction and the light exiting the waveplate 250 being circularly polarized light. Moreover, to obtain circularly polarized output light, the waveplate 250 is rotationally aligned to the second polarizer 228. It should be appreciated that rotating the second polarizer 228 will also rotate the quarter waveplate 250 since the quarter waveplate 250 is laminated to the second polarizer 228.

A further configuration, shown in FIG. 20, includes a method 300 of measuring a test object 100 comprising the following steps. First, according to step 302, a test object 100 is presented within a video measuring system 200, the video measuring system 200 having an imaging system 214 and an illumination system 212. An illumination distribution of light is emitted along an optical path with the illumination system 212 according to step 304, wherein the illumination system 212 comprises a lens system 21, a subassembly 226, and an illumination source 202; the subassembly 226 comprising a pupil aperture 206, and polarizer 222, the polarizer 222 having a diameter that is smaller than the pupil aperture 206. The next step, according to step 306, includes capturing at least a portion of a silhouette of a test object 100 with an imager 48 having an imaging pupil 44 by receiving light transmitted by the test object 100. Then, according to step 308, a second polarizer 228 is rotated independent of and relative to the subassembly 226 to change a ratio of illumination passing through both the polarizer 222 and the second polarizer 228, wherein the second polarizer 228 has a diameter that is larger than the polarizer 222 and overlaps the polarizer 222. According to step 310, the silhouette of the test object 100 is measured. In certain configurations, the method 300 includes the step 312 of applying a quarter waveplate 250 to the second polarizer 228, wherein the second polarizer 228 is positioned between the polarizer 222 and the quarter waveplate 250. In other configurations, the method includes the step 314 of using a circular polarizer 252 comprising second polarizer 228 coupled to and rotationally aligned to a quarter waveplate 250 to form a laminated stack 252. According to step 316, the method 300 may include diffusing the light emitted by the illumination system 12 with a diffuser 224.

As the present disclosure describes particular configurations, it is not limited to these configurations. Alternative configurations, embodiments, or modifications, which will be encompassed by the invention can be made by those skilled in the configurations, embodiments, modifications or equivalents, may be included in the spirit and scope of the invention, as defined by the appended claims.

The invention claimed is:

1. A video measurement system for measuring a test object comprising:
   an imaging system having an imager having an imaging pupil, the imager arranged for viewing at least a portion of a silhouette of a test object by receiving light transmitted by the test object over a first angular extent;

an illumination system having an optical axis and emitting an illumination distribution of light along an optical path, the illumination system comprising an illumination lens and a subassembly having an illumination source, a pupil aperture, and a first polarizer, the first polarizer having a diameter that is smaller than the pupil aperture; and a second polarizer overlapping the first polarizer, the second polarizer having a diameter that is larger than the first polarizer, the second polarizer configured to rotate independent of and relative to the subassembly.

2. The video measurement system of claim 1, wherein the first polarizer and second polarizer are linear polarizers.

3. The video measurement system of claim 1, wherein the first polarizer is in a fixed position relative to the optical axis of the illumination system and wherein the first polarizer is laterally overlapping the pupil aperture.

4. The video measurement system of claim 3, wherein the first polarizer is spaced from the pupil aperture along the optical axis.

5. The video measurement system of claim 1, wherein the imaging pupil is aligned with the first polarizer.

6. The video measurement system of claim 1, wherein the subassembly of the illumination system further comprises a light pipe having an entrance end and an exit end, and wherein the first polarizer is coupled to the exit end of the light pipe.

7. The video measurement system of claim 1, wherein the subassembly further comprises a diffuser laterally overlapping the first polarizer and the pupil aperture.

8. The video measurement system of claim 7, wherein the diffuser is a surface diffuser.

9. The video measurement system of claim 7, wherein the diffuser is a volumetric diffuser.

10. The video measurement system of claim 1, further comprising a quarter waveplate, wherein the second polarizer is positioned between the quarter waveplate and the first polarizer.

11. The video measurement system of claim 1, wherein the second polarizer is a circular polarizer coupled to and rotationally aligned to a quarter waveplate.

12. The video measurement system of claim 1, wherein the illumination system further comprises an output having a second angular extent in object space that is larger than the first angular extent received by the imager, and wherein the pupils of the illumination and imaging systems are in conjugate image planes.

13. A method of measuring a test object comprising:
(a) presenting a test object within a video measuring system, the video measuring system having an imaging system and an illumination system;
(b) emitting an illumination distribution of light along an optical path with the illumination system, the illumination system comprising an illumination lens and a subassembly having an illumination source, a pupil aperture, and a first polarizer, the first polarizer having a diameter that is smaller than the pupil aperture;

(c) capturing at least a portion of a silhouette of a test object with an imager having an imaging pupil by receiving light transmitted by the test object; and
(d) rotating a second polarizer independent of and relative to the subassembly to change a ratio of illumination passing through both the first and second polarizer,
wherein the second polarizer (i) has a diameter that is larger than the first polarizer and (ii) overlaps the first polarizer.

14. The method of claim 13, further comprising the step of measuring the silhouette of the test object.

15. The method of claim 13, further comprising the step of applying a quarter wave plate to the second polarizer to form a laminated stack, wherein the second polarizer is positioned between the first polarizer and the quarter wave plate.

16. The method of claim 13, further comprising the step of diffusing the light emitted by the illumination system.

17. A video measurement system for measuring a test object comprising:
an imaging system comprising an imager having an imaging pupil, the imager arranged for viewing at least a portion of a silhouette of a test object by receiving light transmitted by the test object over a first angular extent;
an illumination system, the illumination system comprising an illumination source emitting an illumination distribution of light along an optical path, an illumination lens, a second angular extent that is larger than the first angular extent received by the imager, and an output, wherein the pupils of the illumination and imaging systems are in conjugate image planes;
a subassembly within the illumination system, the subassembly comprising a pupil aperture and a first polarizer, the first polarizer having a diameter that is smaller than the pupil aperture; and
a second polarizer overlapping the first polarizer, the second polarizer having a diameter that is larger than the first polarizer, the second polarizer configured to rotate independent of and relative to the subassembly.

18. The video measurement system of claim 17, wherein the subassembly further comprises a diffuser.

19. The video measurement system of claim 18, wherein the diffuser is a surface diffuser.

20. The video measurement system of claim 18, wherein the diffuser is a volumetric diffuser.

21. The video measurement system of claim 18, wherein the diffuser is laterally overlapping the first polarizer and the pupil aperture.

22. The video measurement system of claim 17, further comprising a quarter waveplate, wherein the second polarizer is positioned between the quarter waveplate and the first polarizer.

23. The video measurement system of claim 17, further comprising a circular polarizer having the second polarizer coupled to and rotationally aligned to a quarter waveplate.

\* \* \* \* \*